(12) United States Patent
Stiesdal et al.

(10) Patent No.: US 12,168,499 B2
(45) Date of Patent: Dec. 17, 2024

(54) POSITIONING OF A KEEL OF A FLOATING STRUCTURE, ESPECIALLY FOR A WIND TURBINE

(71) Applicant: STIESDAL OFFSHORE A/S, Give (DK)

(72) Inventors: Henrik Stiesdal, Odense C (DK); Uffe Lykke Eriksen, Horsens (DK)

(73) Assignee: Stiesdal Offshore A/S, Give (DK)

( * ) Notice: Subject to any disclaimer, the term of this patent is extended or adjusted under 35 U.S.C. 154(b) by 182 days.

(21) Appl. No.: 17/928,429

(22) PCT Filed: Jun. 4, 2021

(86) PCT No.: PCT/DK2021/050179
§ 371 (c)(1),
(2) Date: Nov. 29, 2022

(87) PCT Pub. No.: WO2021/244724
PCT Pub. Date: Dec. 9, 2021

(65) Prior Publication Data
US 2023/0202624 A1    Jun. 29, 2023

(30) Foreign Application Priority Data

Jun. 4, 2020  (DK) .......................... PA 2020 70355

(51) Int. Cl.
*B63B 35/44* (2006.01)
*B63B 77/10* (2020.01)
*F03D 13/25* (2016.01)

(52) U.S. Cl.
CPC .............. *B63B 35/44* (2013.01); *B63B 77/10* (2020.01); *F03D 13/25* (2016.05); *B63B 2035/446* (2013.01)

(58) Field of Classification Search
CPC ..... B63B 35/4406; B63B 35/44; B63B 77/10; B63B 2035/446; F13D 13/256; F03D 13/25

See application file for complete search history.

(56) References Cited

U.S. PATENT DOCUMENTS

| 3,986,471 A | 10/1976 | Haselton |
| 8,118,538 B2 * | 2/2012 | Pao .......................... F03D 13/22 |
| | | 415/115 |

(Continued)

FOREIGN PATENT DOCUMENTS

| WO | 2009036107 A2 | 3/2009 |
| WO | 2017157399 A1 | 9/2017 |
| WO | 2019106283 A1 | 6/2019 |

OTHER PUBLICATIONS

International Search Report for PCT/DK2021/050179 mailed Aug. 18, 2021.

(Continued)

*Primary Examiner* — Benjamin F Fiorello
(74) *Attorney, Agent, or Firm* — Schmeiser, Olsen & Watts, LLP

(57) ABSTRACT

An offshore floating structure is provided including a floater with positive buoyancy and a keel with negative buoyancy, as well as active and passive suspenders connecting nodes of the keel and the floater with each other. When the keel at the offshore site is lowered by making the active suspenders longer, the passive suspenders, which have a fixed length and are held taut, causes the keel to rotate about the vertical during lowering.

13 Claims, 15 Drawing Sheets

(56) References Cited

U.S. PATENT DOCUMENTS

| | | | |
|---|---|---|---|
| 10,774,813 B2 | 9/2020 | Fernandez Gomez et al. | |
| 2008/0240864 A1* | 10/2008 | Belinsky | F03D 13/22 290/55 |
| 2009/0235856 A1 | 9/2009 | Mansour et al. | |
| 2010/0150664 A1* | 6/2010 | Jakubowski | A01K 61/60 405/224 |
| 2012/0121340 A1 | 5/2012 | Pao | |

OTHER PUBLICATIONS

Written Opinion for PCT/DK2021/050179 mailed Aug. 18, 2021.
Danish Search Report for PA 2020 70355 mailed Dec. 8, 2020.
Supplementary European Search Report, Application No. EP 21 81 7908, May 16, 2024, 2 pages.

\* cited by examiner

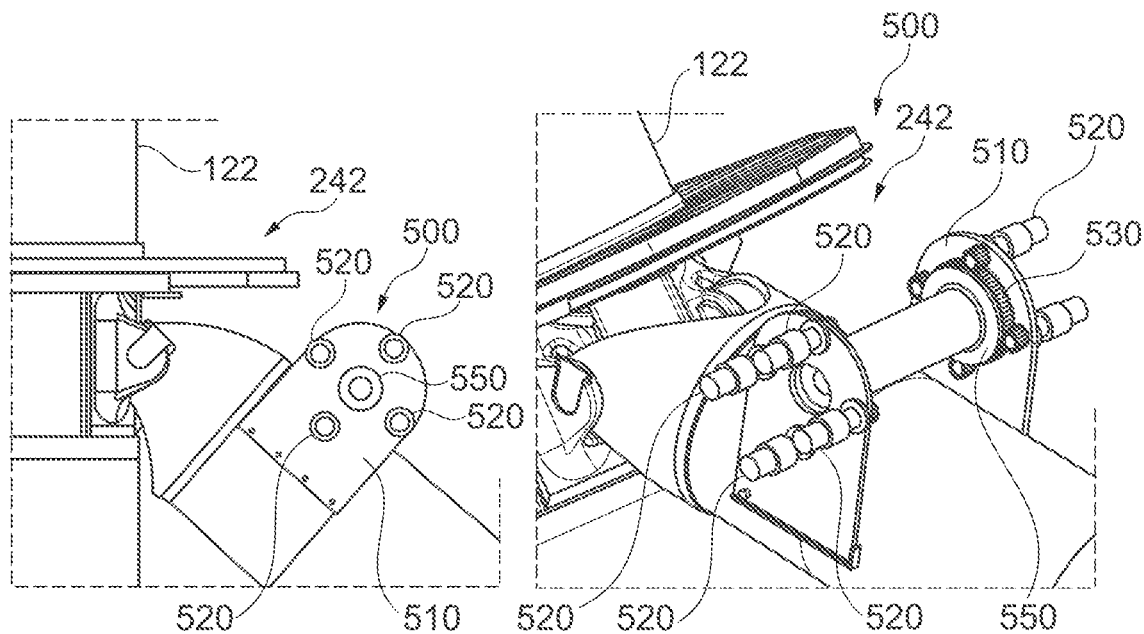
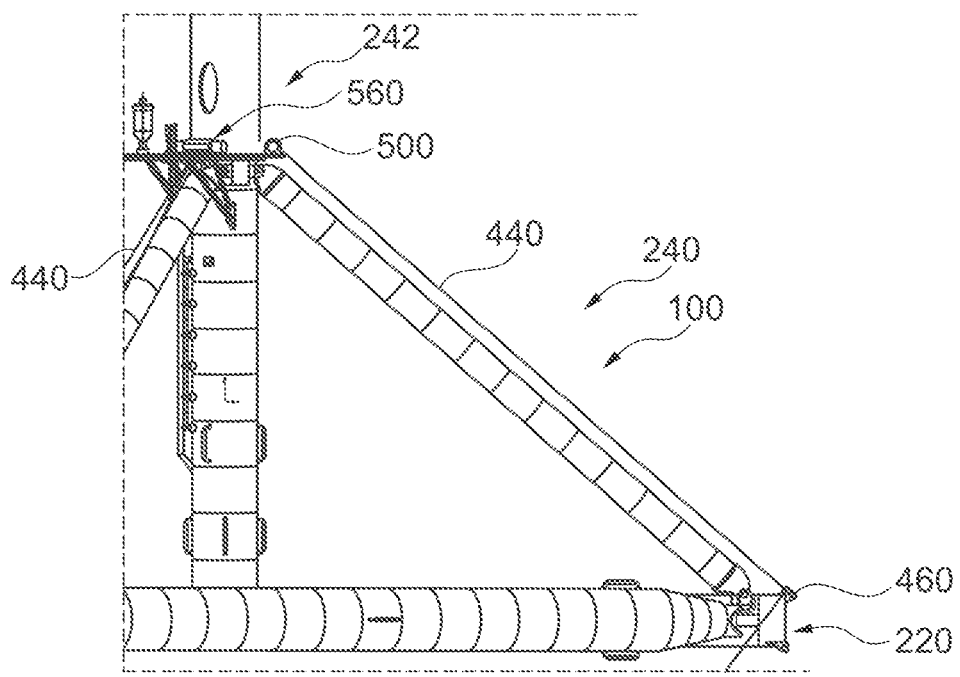

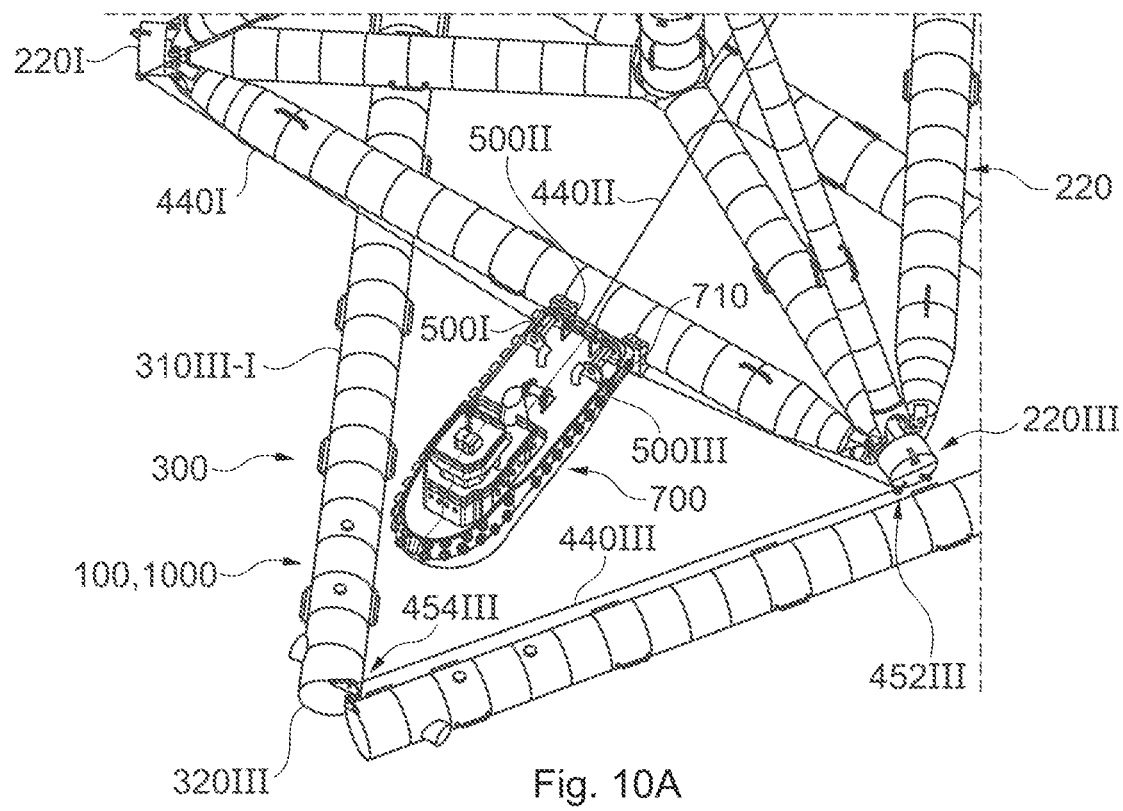
Fig. 10A
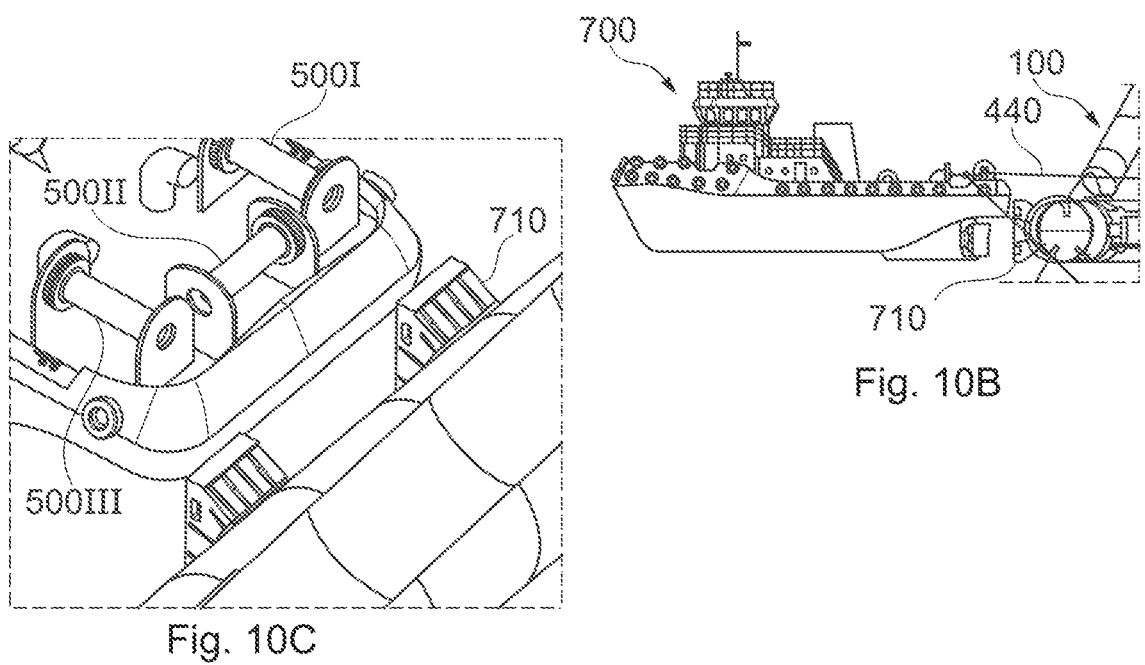
Fig. 10B
Fig. 10C

POSITIONING OF A KEEL OF A FLOATING STRUCTURE, ESPECIALLY FOR A WIND TURBINE

CROSS-REFERENCE TO RELATED APPLICATIONS

This application claims priority to PCT Application No. PCT/DK2021/050179, having a filing date of Jun. 4, 2021, which is based DK Application No. PA 2020 70355, having a filing date of Jun. 4, 2020, the entire contents all of which are hereby incorporated by reference.

FIELD OF TECHNOLOGY

The following relates to positioning a keel of a floating structure and a floating structure configured to perform the positioning.

BACKGROUND

Offshore constructions for modern wind turbines are huge and experience a wide range of forces of the sea. The tasks of transporting, installing and anchoring each pose great challenges that are due not only to the dynamics and variety of waves and winds, but also the sheer scale and magnitude of an offshore construction.

Discussion thereof is found in U.S. Pat. No. 3,986,471 disclosing a floating platform connected with chains to a submerged damping plate. Further, US2012/0121340 discloses a polygonal base on the sea bed and connected by cables to a floating structure that carries a wind turbine. The cables extend from the base over pulleys on the floating structure to a central submerged counterweight.

U.S. Pat. No. 10,774,813 discloses a platform for a wind turbine where the counterweight is kept close to the final floating platform during transportation to the deployment site and then sunk to a greater depth.

US 2009/0235856 discloses a semi-submersible floating platform for use in offshore applications.

The installation on site where the counterweight is deployed, implies some challenges with respect to avoidance of damage. A thorough discussion of various principles is found in WO2017/157399, which itself discloses a support structure for a floating wind turbine, the support structure comprising buoyancy tanks as well as a submerged counterweight for increased stability. The buoyancy tanks are arranged as triangle. During transport, the counterweight is air-filled and located close to the buoyancy tanks. During deployment, the counterweight is filled with water instead, and the submerged deeper into the sea until the suspension chains stop a further downwards movement and define the depth of the counterweight underneath the floating support tetrahedron.

Theoretically, the sinking of the counterweight can be expected to occur smooth and gradually during the filling with water. In practice, however, the sinking may result in the counterweight obtaining substantial speed which is abruptly stopped when the chains are extended. Such abrupt stop implies a risk for damage to the structure. Furthermore, during the sinking of the counterweight, the chains do not guide the counterweight in a vertical direction, which implies a risk for a sideways move of the counterweight relatively to the floating structure. Although, WO2017/157399 also proposes using telescopic arms during the sinking of the counterweight, this only partially solves the problem in that the telescopic arms during the sinking of the counterweight can have different lengths, resulting in a deviation from the vertical sinking and with the risky implications of damage to the structure.

It would be useful to find an improved and more controlled way of deploying the counterweight during installation of the offshore platform on site.

SUMMARY

An aspect relates to improving the art of transporting, installing and deploying a floating structure, especially a floating structure configured to support an operational devise such as a wind turbine generator. In particular, it is an objective to lower a keel from a floating structure during installation at an offshore site while minimizing risk of suspender slack and resulting snap loads between the floater and the keel, as the latter can be cause damage to the structure.

The aspect is achieved by a method of positioning a keel of a floating structure. The method comprising acts as herein disclosed.

There is an act of providing a floating structure comprising a keel that is suspended by suspenders connected to a floater.

There is an act of positioning the keel whilst keeping the suspenders substantially taut at all times and during all phases of the positioning of the keel.

By maintaining the suspenders taut at all times during all phases of the positioning of the keel the floating structure is substantially a single rigid body at all times, both during positioning and at all times before and after positioning. As a consequence, the risk of suspender slack and resulting snap loads between the floater and the keel is significantly reduced.

A further advantage is that the method allows or enables adjustment of the rotational moment of inertia of the floating structure whilst managing a single rigid body and reducing the risk of suspender slack and resulting snap loads between the floater and the keel.

This may be achieved by a method of positioning a keel of a floating structure comprising acts as follows. There is an act of providing a floating structure comprising a keel having negative buoyancy, being suspended by suspenders in a first position below a floater having positive buoyancy. There is an act of arranging the suspenders to connect the keel and the floater in a statically determined manner, thereby forming the floating structure as a substantially dynamically single body. There is an act of positioning the keel in a second position whilst keeping the suspenders substantially taut. Thereby, maintaining the floating structure in a statically determined manner and keeping the floating structure a substantially dynamically single body.

There is a mode of transport and a mode of keel deployment. During both modes, the keel may be positioned at different positions, each position resulting in a specific rotational moment of inertia of the floating structure that provides the opportunity for optimizing the dynamic behaviour of the floating structure at the relevant sea state, mainly through the adjustment of the pitch and roll frequencies through the adjustment of the rotational moment of inertia. Alternating between the transport mode and the keel deployment mode the rotational moment of inertia may be adjusted.

The method also allows for adjusting the rotational moment of inertia during an installation of for example a wind turbine generator on the floating structure. Sea and/or weather conditions may require different levels of rotational moment of inertia. Installation stages of e.g., a wind turbine generator may also require different levels of rotational moment of inertia. The disclosed method enables the structure to remain a single rigid body during such alternations or installations. Also, the risk of suspender slack and resulting snap loads may be reduced or eliminated.

The floater as provided has positive buoyancy. The floater may have adjustable buoyancy. The keel as provided has negative buoyancy. The keel may have adjustable buoyancy.

Positioning is considered to include lowering or hoisting the keel relative to the floater. Positioning also includes positioning the keel in a specific position relative to the floater, e.g., in distance or otherwise relative to the floater, including rotated relative to the floater.

The floater provided is a substantially rigid structure. The floater may be constructed to be more rigid in a floater plane and to be less rigid off the floater plane. The keel provided is a substantially rigid structure. The keel may be more rigid in a keel plane and less rigid off the keel plane. The floater and keel may be provided as disclosed herein. In an aspect, such floater plane and keel plane may be provided as parallel planes.

Due to the opposite directed forces resulting from the positive buoyancy of the floater and the negative buoyancy of the keel, the suspenders being kept substantially taut or under tension will result in the total floating structure, comprising the floater and the keel, being a substantially single rigid structure, behaving like a rigid body.

In one embodiment, the act of providing suspenders comprises providing a passive suspender and an active suspender that engage at substantially the same connection point on the keel and at separated connection points on the floater.

The passive suspender is understood to be a suspender being connected at one suspender end to a connection point on the floater and at another end to a connection point on the keel. As such, the passive suspender has a fixed length.

The active suspender is understood to be a suspender being connected at one suspender end to a connection point of at least one of the floater or keel, and where the other end is operatively connected to the respective other keel or floater, such that the length of the active suspender between the respective connection points of the floater and keel is adjustable.

A suspender may comprise of flexible suspension means, such as chains, links, ropes or similar, or combinations thereof, or it may comprise rigid suspensions means, such as rods, tubes or similar. It may also comprise combinations of flexible and rigid suspension means. It may be rotatably connected to the floater and/or keel through links, bearings, pin connections, universal joints or similar, or combinations thereof. It may be of fixed length, or it may be adjustably connected to the floater and/or keel, allowing adjustment of the suspender length, connecting the floater and the keel. The suspender may be capable of supporting both tensile and compressive loads, or it may be capable of supporting tensile loads only.

The active and the passive suspenders may have different characteristics and/or be made of different materials.

In one embodiment, both the active and the passive suspenders are flexible ropes, e.g., steel ropes, or synthetic ropes made of ultra-high molecular weight polyethylene, polyester, or nylon. In this embodiment, the active and passive suspenders may be made of different materials and/or have different dimensions.

In another embodiment, the active suspender is a flexible rope, and the passive suspender is a rigid member, such as a steel tube.

A person skilled in the art will appreciate the above as a starting point and be able to select or design the actual suspender according to the actual size or mass of the structural elements.

In an embodiment there is a first connection point, e.g., I, on a floater. From this first connection point I, a first end of an active suspender and a first end of a passive suspender are connected. The other and second end of the active suspender is connected to a first connection point, e.g., I, on the keel. The other and second end of the passive suspender is connected to a second connection point, e.g., II, on the keel.

In an aspect, the act of positioning is performed by operatively adjusting the length of the active suspender; that is the length of the active suspender between the connection point on the floater and the connection point on the keel. The positioning may be to lower and/or hoist the keel relative to the floater. The adjustment is performed in such a way that the active and passive suspenders are kept taut. Due to the opposite directed forces of the floater and the keel, the length of an active suspender may be adjusted at a rate that ensures keeping the active suspender substantially taut at all times during positioning of the keel, thereby eliminating the risk of suspender slack and resulting snap loads.

In an aspect, the passive suspender and active suspender at one end engage at substantially the same point and another end at separate points on the respective floater and keel.

It is appreciated that the passive suspender and active suspender form a non-parallel acute angle.

The floater and the keel used may have complementary forms. In particular, the forms considered are the forms resulting from a projection onto the level of the seabed. Examples are disclosed in the figures for a triangular form. Other polygonal or circular forms may be used. Polygons may be formed to have even or odd number of nodes or corners. The basis-elements may be straight or otherwise formed to provide required rigidity.

In an aspect, the floater is substantially a floater triangle, and the keel is substantially a keel triangle. The act of positioning is performed to a transport position where the floater triangle and the keel triangle substantially form a single triangle when superimposed. That is when the projection is onto a plane level to the seabed. There is an act of positioning to a deployed keel position where the floater triangle and the keel triangle substantially form a star when superimposed.

It is appreciated that the floater and keel may have the same shape when projected onto level. In transport position the nodes of the keel may be substantially aligned under the corresponding nodes on the floater.

During position of the keel at keel deployment the keel may be rotated relative to the floater so that nodes on the keel are turned, relative to corresponding nodes on the floater. A node of the keel may be turned to be between the corresponding node and an adjacent node, e.g., to a position where the node of the keel has approximately the same distance to two adjacent nodes on the floater.

As will be exemplified in greater detail below, for a triangular floater structure and a triangular keel structure, three passive suspenders are used and three active suspenders. From each the three corners I, II, and III of the triangular floater, a passive suspender extends to a corresponding one of three corners I', II', and III' on the keel. Also from each the three corners I', II', and III' of the triangular floater, an active suspender extends but not to the same corner to which the passive suspender extended but to a neighbouring corner on the keel, such that the active expander extends from corner I of the floater to corner II' on the keel, and one from corner II on the floater to corner III' on the keel and from corner III of the floater to corner I' on the keel. As the passive suspenders are maintained taut during the lowering of the keel, the distance between the attachment point on the corner on the floater and the attachment point on the corresponding corner on the keel is fixed by the length of the corresponding passive suspender, and the keel will rotate relatively to the floater during the lowering when the keel is deployed from a close distance from the floater to a larger distance.

In more general terms, for useful embodiments, the floater has a number of polygonal floater nodes, including a first floater node, a second floater node, and a third floater node, and the keel has a corresponding number of polygonal keel nodes, comprising a first keel node, a second keel node, and a third keel node, wherein the counting of nodes is in a rotational direction around the corresponding polygon, for example clockwise. The suspenders are provided in a corresponding number of suspender pairs, each pair comprising a passive suspender and an active suspender, Each of the active suspenders connects only one floater node with only one keel node. The first floater node and the first keel node are connected by a first active suspender, the second floater node and the second keel node are connected by a second active suspender, and the third floater node and the third keel node are connected by a third active suspender.

Each of the passive suspenders connect only one floater node with only one keel node. The first floater node and the second keel node are connected by a first passive suspender, the second floater node and the third keel node are connected by a second passive suspender, and a third passive suspender connects the third floater node with a keel node that is neighbor to the second keel node. Such neighbor keel node is the first keel node in the case of the keel only having three keel nodes.

The method comprises suspending the keel by the suspenders in a first position at a first depth under water below the floater, and then keeping the suspenders substantially taut while changing the vertical distance between the floater and the keel from the first position at the first depth to a second position at a second depth by changing the length of all active suspenders. Further, by at the same time maintaining each of the passive suspenders at a fixed length with a fixed distance between its connection point on the floater and its connection point on the keel, the keel is forced into rotation relatively to the floater and about the vertical direction The length of the passive suspender may be adjusted to achieve the above. A longer passive suspender will allow the keel to go deeper.

A specific deployed position of the keel may be achieved when the lengths of corresponding or all passive and active suspenders are identical.

In an aspect, the act of positioning is performed by adjusting the length of an active suspender by a winch. In principle the length of a passive suspender may also be adjusted, although the passive suspender may have a predetermined and fixed length. A person skilled in the art will appreciate that an active suspender is an operational suspender.

The length may be adjusted by controlling the suspenders by one or more winches. The winches may be located on separate vessels, or they may be arranged on the floating structure. Arranging the winches on the floating structure allows the floating structure to be operational on its own, like a vessel. Winches may be placed permanently on the floating structure or may be arranged temporarily during transport and keel deployment and then be removed when the keel has been deployed as intended. The floating structure may also be provided in a transport mode without winches. The winches may then be installed temporarily when the keel is to be deployed to its installed position.

A winch may be arranged in a safe position on the floating structure. Examples are given in the detailed description. Guides to the suspenders may be arranged suitably between the winch and the contact point.

The winch may be provided according to the size, weight and other circumstances of the operation.

For a floating structure, configured to support an offshore wind turbine, the keel mass may be in the order of hundreds or thousands of tons. In order to provide stability to the complete structure, comprising the floater and the keel, during transport from the port to the final position, the keel may be de-ballasted to a moderate negative buoyancy before transport. The de-ballasting will typically be to a level that provides sufficient negative buoyancy to ensure that the suspenders are taut at all times during transport and deployment, while the stability of the complete structure is maintained at a desired level. As an additional advantage of de-ballasting, the size of winch required for positioning will be reduced, since it only has to support a certain proportion of the final and ballasted weight of the keel.

In an embodiment, the floating structure has a floater formed as a tetrahedral structure where the base is a floater base. An element or leg going from the floater base to the apex may support a winch and the suspender may be supported by such leg and leading to a node or corner on the base.

In an aspect, the act of positioning is performed by controlling the suspenders by one or more winches arranged on one or more vessels.

Controlling or adjusting the length of a suspender may be performed via a vessel being operated separate to the floating structure. The vessel may be fitted with one or more winches.

The floating structure is then provided with suspender guides arranged to guide one or more suspenders from a vessel to a connection point. The suspenders may be operated by respective individual vessels. The suspenders may be guided to be operated by one vessel with one or more winches to operate the respective suspenders. Suspender guides may be placed to allow for change of direction, turn or as guides along a straight path of a suspender.

An advantage is that keel positioning i.e., positioning may be separated from installation and can be initiated in a simple way. The positioning of the keel may save time and thus operational complexity and time, which is a sparse resource offshore.

The time spent on lowering a keel when the floating structure is configured to support an offshore wind turbine, can be less than one hour or less than half an hour.

In an aspect, the act of positioning is performed with a vessel, with a winch operating an active suspender at each floater node of the floater to position the keel.

This way the suspender or line complexity is minimized.

In an aspect, the act of positioning is performed by a single vessel operating an active suspender at each floater node of the floater to position the keel node one-by-one and stepwise.

This way the suspender or line complexity is minimized and only one vessel is required.

In an aspect, the act of positioning is performed with a single vessel comprising multiple winches, each operating respective active suspenders connected to respective keel nodes for positioning the keel.

This way only one vessel is required, and each keel node may be positioned individually or simultaneously. A further advantage is that the vessel to floater interaction becomes simpler, since the vessel interacts with the floater along a leg rather than at a node as will be exemplified in the detailed description.

In an aspect, the act of positioning is performed with a single vessel with a single winch operating multiple active suspenders connected to respective keel nodes for positioning the keel.

This way one vessel with a standard (albeit large vessel with large winch) winch may be used.

An object is achieved by a floating structure comprising a floater, a keel and active and passive suspenders.

The floater is configured with positive buoyancy according to the support structure. The floater is configured with suspenders arranged for suspending a keel configured with negative buoyancy. The suspenders comprise at least a passive suspender configured with a fixed length and at least an active suspender configured to be adjusted in length so that the keel may be lowered and/or hoisted.

The passive and active suspenders are arranged so that at one end they engage at substantially the same point. At another end of the passive and active suspenders they connect to separate points on the respective floater and keel.

Thereby, is provided a floating structure that can be operated as outlined and where the keel can be positioned whilst having the same advantages as outlined previously.

A passive suspender is configured with a fixed length in the sense that a passive suspender is connected to the floater and to the keel at a given length. The given length may be selected, predetermined, changed, or even adjusted, but generally the passive suspender is provided with a predetermined length to define a predetermined distance between the connection point on the floater and the connection point on the keel.

The active suspender is configured to be operatively adjusted in length so that a distance between the connection points on the respective floater and keel is adjusted.

The floating structure may be equipped with means to adjust and hold an active suspender. The floating structure may be configured with means to adjust suspenders as stand-alone or there may be interface means such as guides arranged on the floating structure to allow the auxiliary devices or vessels to adjust the length of active suspenders.

The active and passive suspenders may be left in place to act as permanent suspenders of the keel in the as-deployed, final position. Alternatively, their function in the suspension of the keel may be taken over by other, permanent suspenders.

In one embodiment, the keel is permanently supported by permanent suspenders. During transport and deployment some of the permanent suspenders act as the passive suspenders for the positioning of the keel, while the remaining permanent suspenders are attached to the floater and/or keel by suitable means and do not or at least not fully provide the part of the positioning that is carried out by the active suspenders. In this case the active suspenders lower the keel to such a position where the permanent suspenders take over and the active suspenders become slack.

To exemplify a floating structure, a keel is formed as a keel polygon with keel elements comprising negative buoyancy elements connected at keel nodes. The floater is formed as a floater polygon with floater elements comprising positive buoyancy elements connected at floater nodes. The keel polygon and floater polygon may be substantially identical or scaled versions of each other. In an embodiment, the forms may be so that the floater is a floater triangle, and the keel is a keel triangle.

The floating structure may be configured so that the keel polygon, e.g., keel triangle, is substantially identical to the floater polygon, e.g., floater triangle. The floater and keel are substantially aligned and configured for a transport mode.

The above disclosures enable that the keel and floater will be rotated relative to each other during the keel deployment mode as the active suspenders are gradually released whilst being kept taut.

There may be means to control the length of an active suspender. There may be means to hold the active suspender at a given length.

In an aspect, at least one active suspender is operatively connected to at least one winch. The winch may adjust the length of the active suspender and the winch may hold the length of the active suspender.

The arrangement of the active suspender and the winch may be configured so that the length of the active suspender can be adjusted from a given length to a length, which for a given length of the passive suspender, will allow the keel to separate from the floater in a distance equal to the passive length. In an embodiment, the active suspender may be provided so that the length can be adjusted from "zero" (as short as possible) to the length of the configured passive suspender.

There may be a computational unit with a computer program configured to receive input from sensors arranged on the floater, the keel and the active suspender and further configured to control the active suspenders in such a way that the lengths of the active suspenders are controlled or adjusted being kept taut whilst positioning the keel.

In an aspect, the floater is formed as a tetrahedral structure wherein the floater base comprises buoyancy elements connected at floater nodes. The apex of the tetrahedral is configured to support a wind turbine tower. The keel is formed as a keel triangle substantially complementary formed to the floater base.

Such floating structure has been found to be a substantially rigid single body structure when attached to the keel, and to be able to support an offshore wind turbine generator during a variety of offshore conditions. The structure has been found to have natural frequencies outside the natural frequencies of waves at relevant sea states, and it has been found to avoid slack forces otherwise emerging due to the inter dynamic relationship between forces by wind and waves on the wind turbine and counterforces from the keel.

In short, there may be a floating structure as outlined and further comprising a computational unit that is configured to perform the acts as outlined. A computer program to perform the instructions may be provided.

In some embodiments, the present invention relates to a method of installing an offshore floating structure, wherein the floating structure comprises a floater with positive buoyancy and a keel with negative buoyancy, as well as suspenders connecting the keel and the floater with each other.

The floater has a number of floater nodes arranged in polygonal configuration, including a first floater node, a second floater node, and a third floater node, and the keel has a corresponding number of keel nodes arranged in polygonal configuration, including a first keel node, a second keel node, and a third keel node;

wherein the suspenders are provided in a corresponding number of suspender pairs, each pair comprising a passive suspender and an active suspender, wherein each of the active suspenders connect at least one floater node with at least one keel node, each of the active suspenders connect only one floater node with only one keel node, wherein the first floater node and the first keel node are connected by a first active suspender, wherein the second floater node and the second keel node are connected by a second active suspender, wherein the third floater node and the third keel node are connected by a third active suspender, wherein each of the passive suspenders connect at least one floater node with at least one keel node, wherein each of the passive suspenders connect only one floater node with only one keel node, wherein the first floater node and the second keel node are connected by a first passive suspender, wherein the second floater node and the third keel node are connected by a second passive suspender, and wherein a third passive suspender connects the third floater node with a keel node that is neighbor to the second keel node, wherein this neighbor keel node is the first keel node in the case of the keel only having three keel nodes;

wherein the method comprises suspending the keel by the suspenders in a first position at a first depth under water below the floater.

The polygonal configuration may be a triangle as shown in FIG. 1, however the polygonal configuration may be a different configuration.

The method may further comprise: keeping suspenders substantially taut while changing the vertical distance between the floater and the keel from the first position at the first depth to a second position at a second depth under water by changing the length of all active suspenders and causing a rotation of the keel relatively to the floater about the vertical direction by maintaining each of the passive suspenders at a fixed length with a fixed distance between its connection point on the floater and its connection point on the keel.

The keel may be formed as a polygon with keel elements comprising negative buoyancy elements connected at the keel nodes and wherein the floater is formed as a polygon with floater elements comprising positive buoyancy elements connected at the floater nodes.

In some embodiments the floater has only three floater nodes which are arranged as a triangle and from which suspenders extend to the keel nodes, and wherein the keel has only three keel nodes which are arranged as a triangle from which the suspenders extend to the floater.

The floater may be formed substantially as a floater triangle and the keel is substantially formed as a complementary shaped keel triangle (333), and wherein the method comprises transporting the offshore floating structure to an offshore deployment site while the floater triangle and the keel triangle substantially form a single triangle when superimposed, and at the site changing to a deployed configuration where the floater triangle and the keel triangle are rotated relatively to each other.

The floater can also be formed as a tetrahedral structure with a floater base that comprises buoyancy elements connected at the floater nodes and wherein an apex (240) of the tetrahedral structure (240) supports a wind turbine tower.

Aspects

In the following, a number of interrelated aspects are presented which can be combined with the other features described herein.

Aspect 1. A method of positioning a keel (1000) of a floating structure (100), the method comprising acts of:

providing (1100) a floating structure (100) comprising a keel (300) having negative buoyancy suspended by suspenders (400) in a first position (1001) below a floater (200) having positive buoyancy;

arranging (1150) the suspenders (400) to connect the keel (300) and the floater (200) in a statically determined manner so as to form substantially a dynamically single body;

positioning (1200) the keel (300) in a second position (1002) whilst keeping (1210) the suspenders (400) substantially taut.

Aspect 2. The method (1000) according to Aspect 1, wherein the act of providing (1100) suspenders (400) comprises providing (1200) a passive suspender (420) and an active suspender (440) that engage at substantially the same connection point (450I; 452I) and at separated connection points (450II, 450III; 454II, 454III) on the respective floater (200) and keel (300), wherein the passive suspender is configured to have a fixed length and the active suspender is configured to have an adjustable length.

Aspect 3. The method (1000) according to Aspect 2, wherein the act of positioning (1200) is performed by operatively adjusting the length of the active suspender (440) whilst keeping the active suspender (440) substantially taut at all times during positioning (1200).

Aspect 4. The method (1000) according to Aspect 2 or 3, wherein the passive suspender (420) and active suspender (440) at one end (410A) engage at substantially the same connection point (450I; 452I) and another end (410B) at separate connection points (450II, 450III; 454II, 454III) on the respective floater (200) and keel (300).

Aspect 5. The method (1000) according to any one or more of Aspects 1 to 4, wherein the floater (200) may substantially be a floater triangle (233) and the keel (300) substantially is a keel triangle (333), and wherein the act of positioning (1200) is performed to:

a transport position (1510) where the floater triangle (233) and the keel triangle (333) substantially form a single triangle when superimposed; and a deployed position (1710) where the floater triangle (233) and the keel triangle substantially form a star when superimposed.

Aspect 6. The method (1000) according to any one or more of Aspects 1 to 5, wherein the act of positioning (1200) is performed by operating the suspenders (400) by one or more winches (500) arranged on the floating structure (100).

Aspect 7. The method (1000) according to any one or more of Aspects 1 to 5, wherein the act of positioning (1200) can be performed by operating the suspenders (400) by one or more winches (500) arranged on one or more vessels (700).

Aspect 8. The method (1000) according to Aspect 7, wherein the act of positioning (1200) is be performed with a vessel (700; 700I,II,III) each with a winch (500; 500I,II,III) operating an active suspender (440; 440I,II,III) at each floater node (220; 220I,II,III) of the floater (200) to position (1200) the keel (300).

Aspect 9. The method (1000) according to Aspect 7, wherein the act of positioning (1200) is performed by a single vessel (700) operating an active suspender (440; 440I,II,III) at each floater node (220; 220I,II,III) of the floater (200) to position (1200) the keel node (320; 320I,II,III) one-by-one and stepwise.

Aspect 10. The method (1000) according to Aspect 7, wherein the act of positioning (1200) is performed with a single vessel (700) comprising multiple winches (500; 500I,II,III) each operating respective active suspenders (440;

440I,II,III) connected to respective keel nodes (320; 320I, II,III) to position (1200) the keel (300).

Aspect 11. The method (1000) according to Aspect 7, wherein the act of positioning (1200) is performed with a single vessel (700) with a single winch (500) operating multiple active suspenders (440; 440I,II,III) connected to respective keel nodes (320; 320I,II,III) to position (1200) the keel (300).

Aspect 12. A floating structure (100) comprising:
- a floater (200) configured with positive buoyancy configured with suspenders (400) at one end (410A) suspending at another end (410B);
- a keel (300) configured with negative buoyancy;
wherein the suspenders (400) comprise a passive suspender (420) configured with a fixed length and an active suspender (440) configured to be adjusted in length and wherein the passive suspender (420) and active suspender (440) at one end (410A) engage at substantially the same connection point (450I; 452I) and another end (410B) at separate connection points (450II, 450III; 454II, 454III) on the respective floater (200) and keel (300).

Aspect 13. The floating structure (100) according to Aspect 12, wherein the keel (300) of the floating structure may be formed as a keel polygon (330) with keel elements (310) comprising negative buoyancy elements connected at keel nodes (320) and wherein the floater (200) is formed as a floater polygon (230) with floater elements (210) comprising positive buoyancy elements connected at floater nodes (220).

Aspect 14. The floating structure (100) according to Aspect 12 or 13, wherein the floater (200) is formed as a tetrahedral structure (240) wherein the floater base (212) comprises buoyancy elements connected at floater nodes (220) and wherein the apex (240) is configured to support a wind turbine tower (122) and wherein the keel (300) is formed as a keel triangle (333) substantially complementary formed to the floater base (212).

Aspect 15. The floating structure (100) according to anyone of Aspects 12-14, wherein at the floating structure the least one active suspender (440) is operatively connected to at least one winch (500).

Aspect 16. A floating structure (100) according to any one or more of Aspects 12-15 comprising a computational unit (600) configured to perform the acts according to any one or more of Aspects 1-11.

BRIEF DESCRIPTION

Some of the embodiments will be described in detail, with references to the following Figures, wherein like designations denote like members, wherein:

FIG. 7A illustrates operating suspenders by winches on a floating structure;

FIG. 7B illustrates operating suspenders by winches on a floating structure;

FIG. 7C illustrates operating suspenders by winches on a floating structure;

FIG. 10A illustrates details of multiple winches on a single vessel;

FIG. 10B illustrates details of multiple winches on a single vessel;

FIG. 10C illustrates details of multiple winches on a single vessel;

| Item # | Item |
|---|---|
| 100 | Floating structure |
| 110 | Sea level |
| 120 | Wind turbine generator (WTG) |
| 122 | Tower |
| 200 | Floater |
| 210 | Floater elements |
| 212 | Floater base |
| 220 | Floater node |
| 230 | Floater polygon |
| 233 | Floater triangle |
| 240 | Tetrahedral structure |
| 242 | Apex |
| 300 | Keel |
| 310 | Keel elements |
| 320 | Keel node |
| 330 | Keel polygon |
| 333 | Keel triangle |
| 400 | Suspenders |
| 410 | Suspender end |
| 420 | Passive suspender |
| 440 | Active suspender |
| 450 | Connection point |
| 452 | Floater connection point |
| 454 | Keel connection point |
| 460 | Suspender guide |
| 470 | Transport line |
| 500 | Winch |
| 510 | Winch support |
| 520 | Yaw gear |
| 530 | Yaw ring |
| 540 | Yaw clamp |
| 550 | Drum |
| 600 | Computational unit |
| 700 | Vessel |
| 710 | Damper/Bumper |
| 1000 | Positioning a keel |

-continued

| Item # | Item |
|---|---|
| 1001 | First position |
| 1002 | Second position |
| 1100 | Providing |
| 1150 | Arranging |
| 1200 | Positioning |
| 1210 | Keeping |
| 1500 | Transporting |
| 1510 | Transport position |
| 1600 | Installing |
| 1610 | Installation position |
| 1700 | Deployment |
| 1710 | Deployed position |

DETAILED DESCRIPTION

Figure 1:
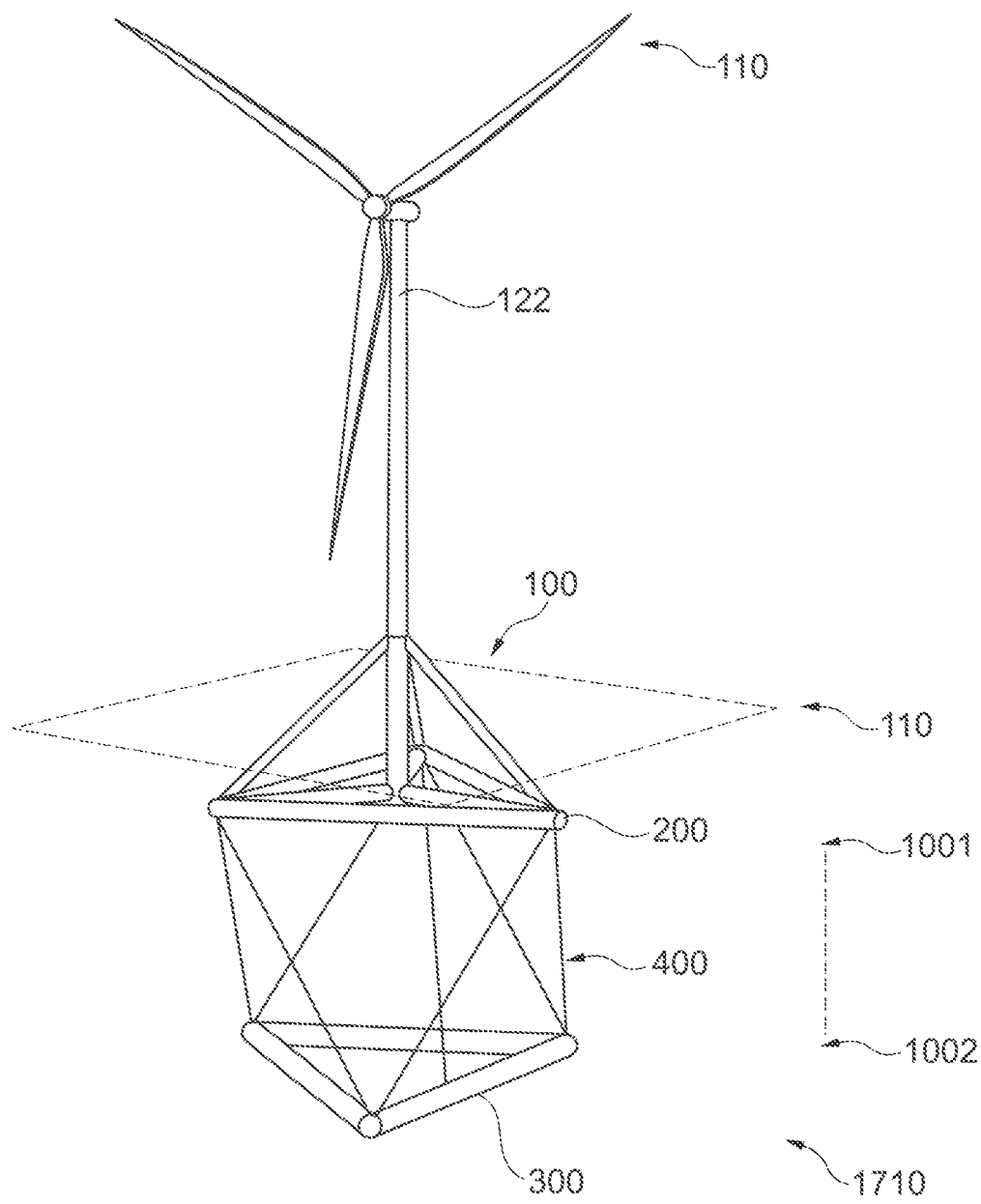
FIG. 1 illustrates a floating structure with a floater and a keel.

FIG. 1 illustrates a floating structure 100 with a floater 200 and a keel 300. The keel 300 is suspended by suspenders 400. As an example, the floating structure 100 is configured to support a tower 122 of a wind turbine generator 120. The position of the keel 300 is here in a deployed position 1710.

The principles disclosed herein are generic but for illustrative purposes, the floating structure 100 is illustrated with reference to a sea level 110. Optional anchoring lines are indicated towards the sea floor (not shown).

Generally, the figures relate to a method of positioning the keel of the floating structure 100 between a first position 1001 and a second position 1002 maintaining the structure in a statically determined manner so as to form substantially a dynamically single body in the first position 1001, in the second position 1002 and substantially in between the first and second position 1001, 1002.

There is an act of providing the floating structure 100 comprising the keel 300 having negative buoyancy suspended by the suspenders 400 in the first position 1001 below the floater 200 having positive buoyancy. There is an act of arranging the suspenders 400 to connect the keel 300 and the floater 200 in a statically determined manner so as to form substantially a dynamical single body, and there is an act of positioning the keel 300 in the second position 1002 whilst keeping the suspenders 400 substantially taut.

As will be outlined, the first or second position 1001, 1002 may be e.g., a transport position, an installation position, or a deployment position. The depicted position is a deployed 1710 or anchored position.

Figure 2A:
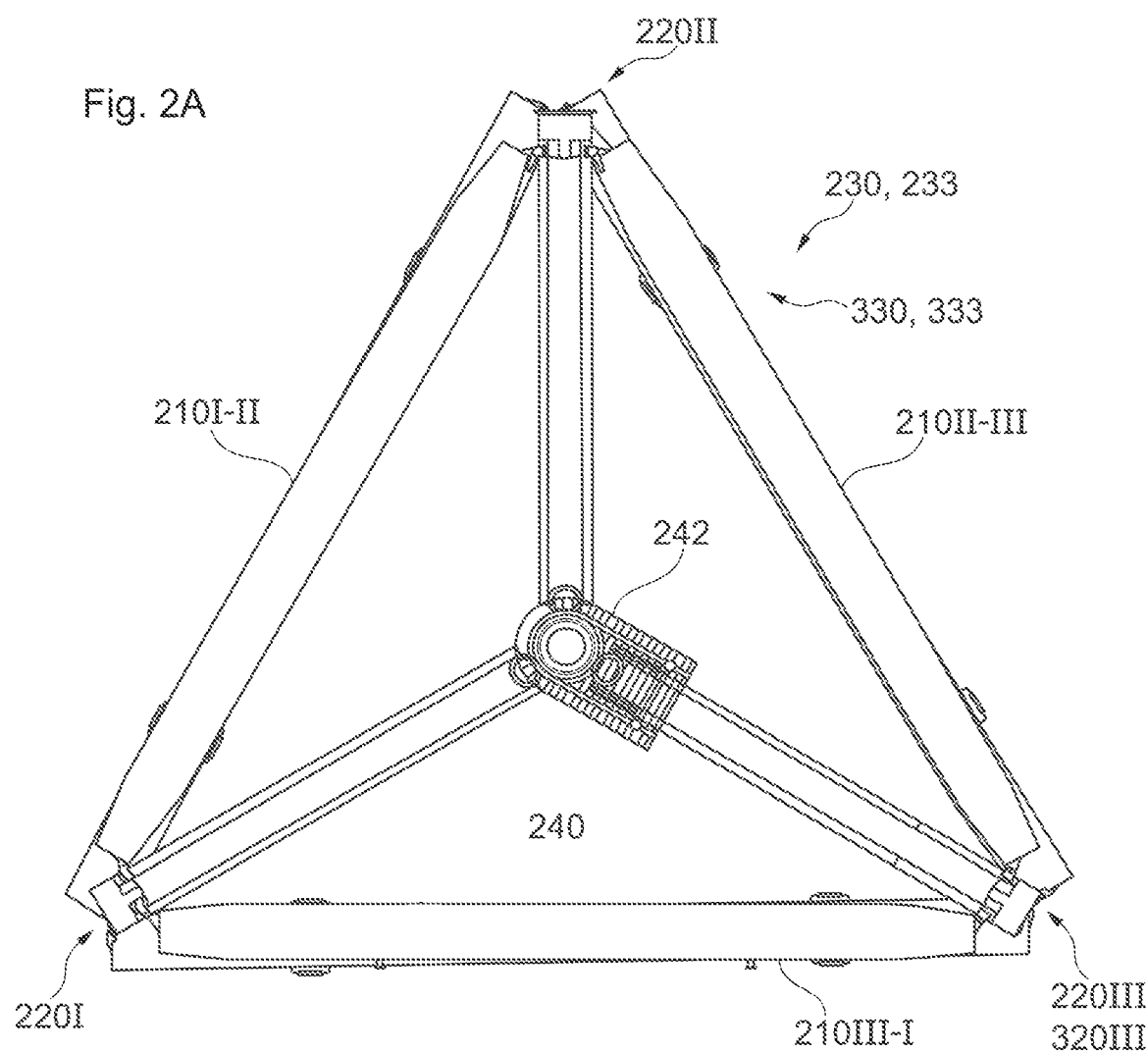
FIG. 2A illustrates a floating structure with a keel in a transport mode.
Figure 2B:
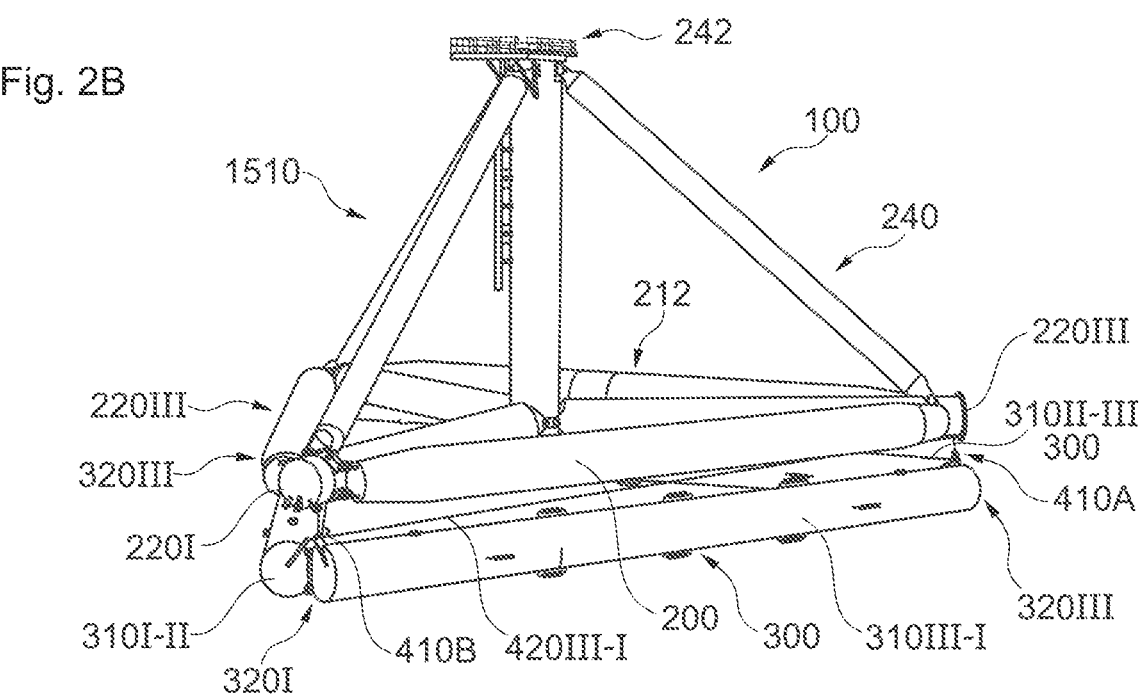
FIG. 2B illustrates a floating structure with a keel in a transport mode.

FIGS. 2A and 2B illustrate a floating structure 100 in a top view A and a perspective view B.

Figure 3:
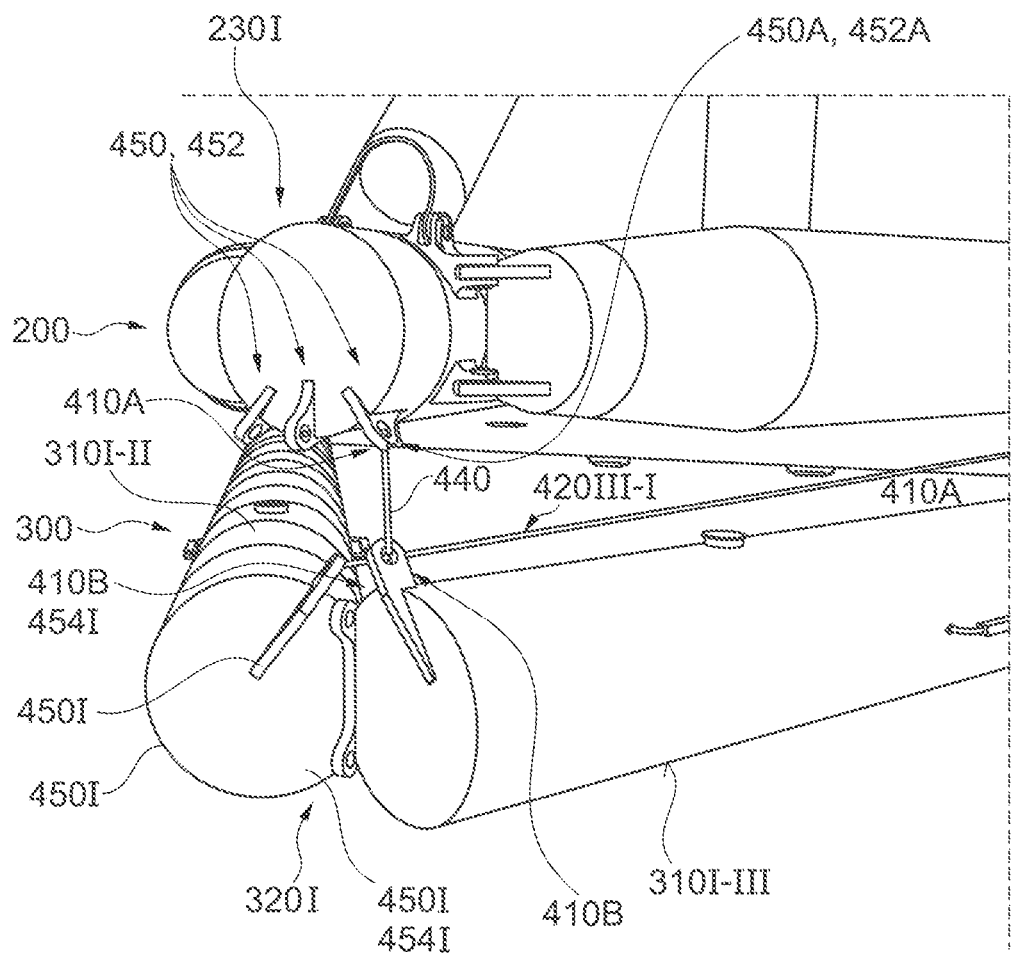
FIG. 3 illustrates aspects of an arrangement of suspenders at nodes.

FIG. 3 illustrates details of the floating structure 100 in the perspective view from FIG. 2B.

With reference to FIG. 1, the floating structure 100 has the keel 300 in a different position. The position is representative of a position during deployment of the keel 300.

The floating structure 100 comprises a floater 200 configured with positive buoyancy. There is a keel 300 configured with negative buoyancy.

The floater 200 suspends the keel 300 via suspenders 400.

The suspenders 400 comprise a passive suspender 420 configured with a fixed length and an active suspender 440 configured to be adjusted in length.

In this case the suspender end 410A is connected to the floater 200 and the suspender end 410B is connected to the keel 300. FIG. 3 shows an active suspender 440 being connected at the suspender end 410A to a connection point 450A on the floater 100 and the opposite suspender end 410B being connected at a connection point 450B on the floater 200.

Figure 4A:
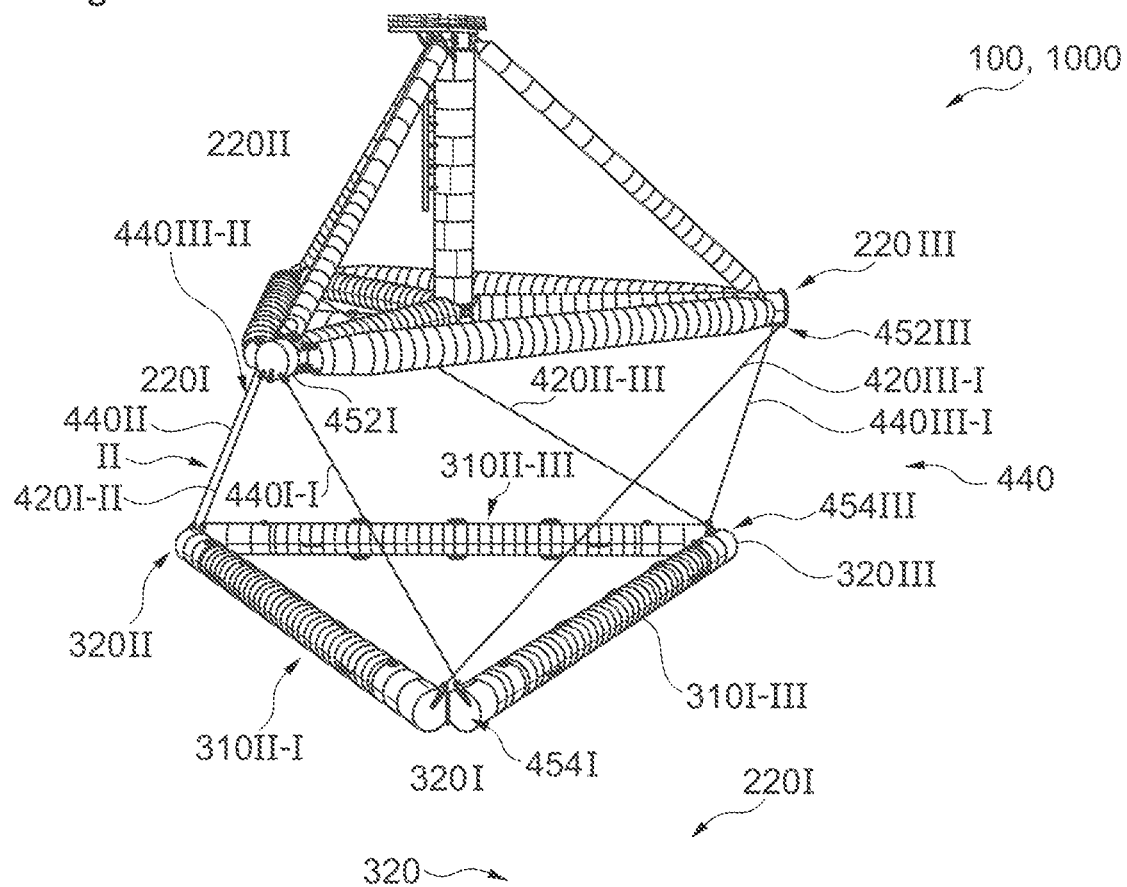
FIG. 4A illustrates a floating structure with a keel being positioned.
Figure 4B:
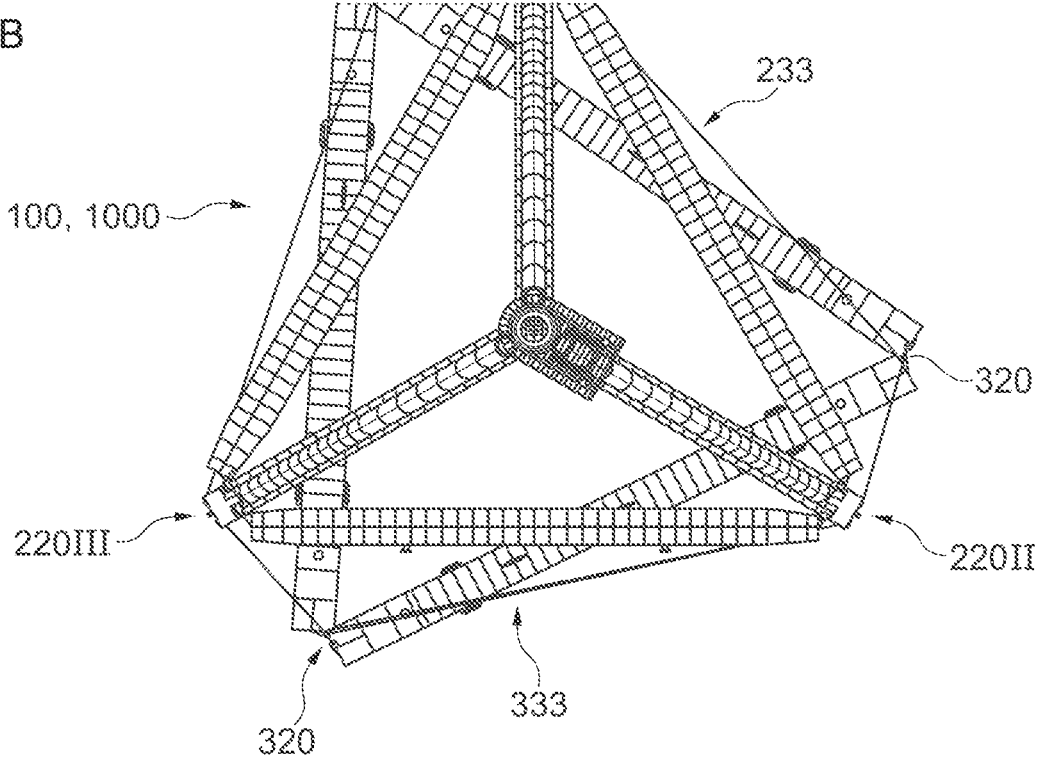
FIG. 4B illustrates a floating structure with a keel being positioned.

As seen in FIGS. 2A to 3 and more so in FIGS. 4A and 4B, the passive suspender 420 and active suspender 440 at one end 410A engage at substantially the same connection point 450I; 452I and another end 410B at separate connection points 450II, 450III; 454II, 454III on the respective floater 200 and keel 300.

In this case the active suspender 440 and the passive suspender 420 connect to the same point or same floater node 220. The floater 200 is shown as a floater polygon 230; more specifically a floater triangle 233. The floater triangle 233 has floater nodes 220I, II, III (clockwise seen from above). The floater 200 has floater base 212 that is formed as the floater polygon 230, i.e. floater triangle 233, with floater elements 210 comprising positive buoyancy elements connected at the floater nodes 220.

The keel (300) is formed as a keel polygon (330) with keel elements (310) comprising negative buoyancy elements connected at keel nodes (320). The keel polygon 330 is here formed as a keel triangle 333 having nodes 320I, II, III, which numbering makes the floater nodes 220 and keel nodes 320 correspond, such that the corresponding keel node 320 is right under the floater node 220 in the transport position 1510 (see FIGS. 2A and 2B).

In this particular configuration, FIGS. 2A and B illustrate an embodiment where the floater (200) is formed as a tetrahedral structure (240) wherein the floater base (212) comprises buoyancy elements connected at floater nodes (220). The apex (242) of the tetrahedral structure 240 is configured to support a wind turbine tower (122). The keel (300) is formed as a keel triangle (333) that is complementary formed to the floater base (212) as is seen in FIG. 2A.

FIGS. 4A perspective and 4B top view illustrates the same floating structure 100 as seen in FIG. 2 and detailed in FIG. 3. The keel 300 is being positioned 1000.

FIG. 4A illustrates the arrangement of suspenders 400. In example, a passive suspender 420 and an active suspender 440 engage at substantially the same connection point 450I; 452I and at separated connection points 450II, 450III; 454II, 454III on the respective floater 200 and keel 300.

In example, for floater node 220I: there is an active suspender 440I-I (connecting floater node 220I and keel node 320I). The active suspender 440I-I is connected to the floater node 220I at a floater connection point 452I and to a keel connection point 454I. It is seen that the keel connection point 454I is connected to the keel element 310I-III (connecting keel node 320I and keel node 320III) at the end towards keel node 320I. The corresponding passive suspender 420 is the suspender 420III-I (connecting floater node 220III and keel node 320I). The passive suspender 420III-I is connected at the floater connection point 452III in the way seen for floater node 220I as floater connection point 452I and at the keel element 310II-I (connecting keel node 320II and keel node 320I) at the end towards keel node 320II.

It is seen that the floater has connection points 450 as floater connection points 452 at a specific floater node structure. Such equivalent floater node structure could be applied to a keel node.

It is also seen that floater node 220I is the same connecting point 452I for a passive suspender 420I-II connecting to keel node 320II and an active suspender 440I-I connecting to keel node 320I, which is separated from keel node 320II.

Thus, the floater triangle 233 suspends the keel triangle 333 by suspenders 440 that are operatively arranged according to the above numbering.

Floater node 220I is the same connecting point 452I for a passive suspender 420I-II connecting to keel node 320II and an active suspender 440I-I connecting to keel node 320I, which is separated from keel node 320II.

Floater node 220II is the same connecting point 452II for a passive suspender 420II-III connecting to keel node 320III and an active suspender 440II-II connecting to keel node 320II, which is separated from keel node 320III.

Floater node 220III is the same connecting point 452III for a passive suspender 420III-I connecting to keel node 320I and an active suspender 440III-III connecting to keel node 320IIII, which is separated from keel node 320I.

It is also seen that:

Keel node 320I is the same connecting point 454I for a passive suspender 420III-I connecting to floater node 220III and an active suspender 440I-I connecting to floater node 220I, which is separated from floater node 220III.

Keel node 320II is the same connecting point 454II for a passive suspender 420I-II connecting to floater node 220I and an active suspender 440II-II connecting to floater node 220II, which is separated from floater node 220I.

Keel node 320III is the same connecting point 454III for a passive suspender 420II-III connecting to floater node 220III and an active suspender 440I-I connecting to floater node 220I, which is separated from floater node 220III.

The resulting grid structure is a statically determined, substantially single rigid body that is maintained as the suspenders are kept taut whilst the keel 300 is being positioned 1000. The keel 300 shown here is about one third from the transport position 1510 (from FIGS. 2A and 2B) and a deployed position 1710 (see e.g., FIG. 9).

Figure 5:
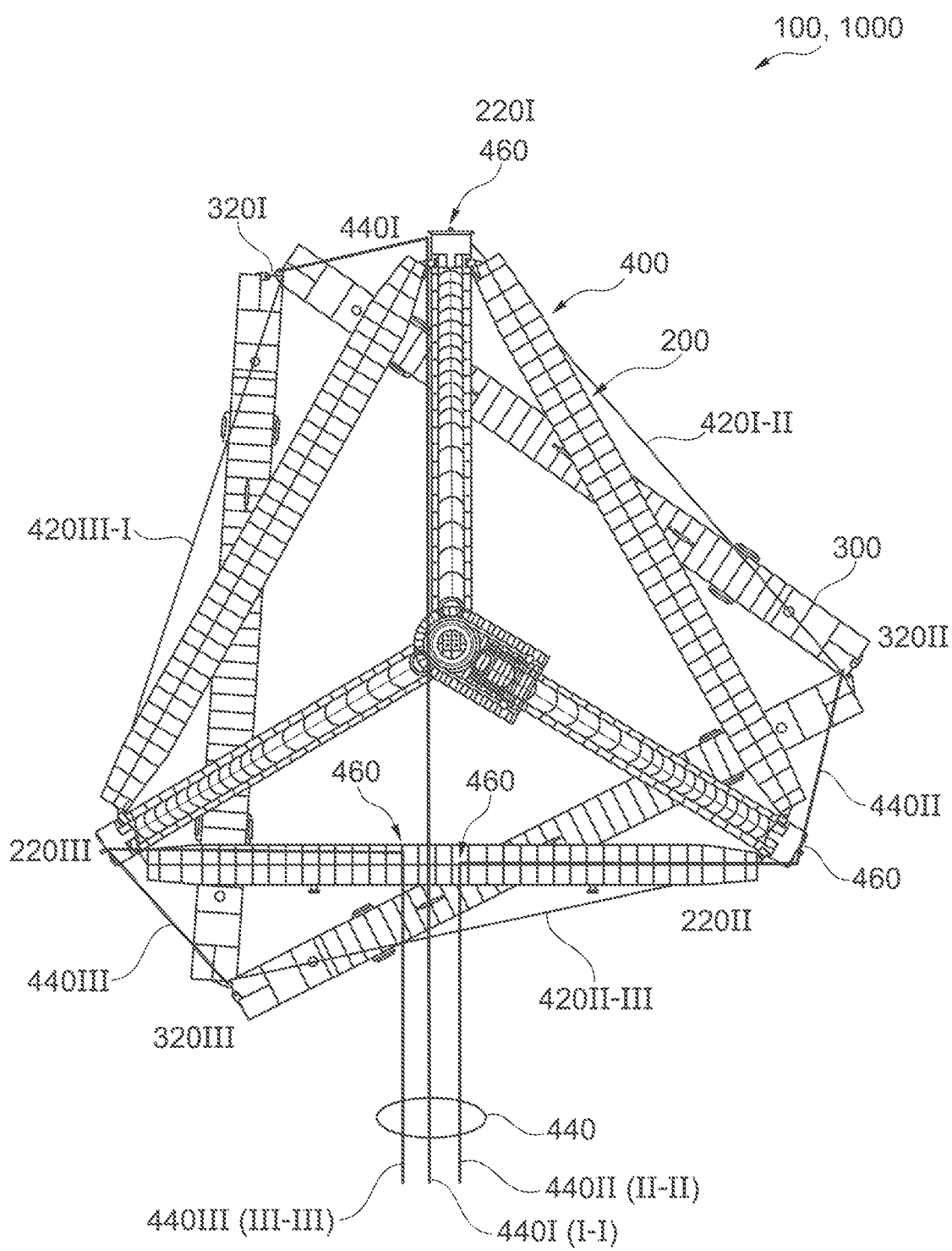
FIG. 5 illustrates an embodiment of suspenders during positioning.

FIG. 5 illustrates an embodiment of suspenders 400 of a floating structure 100 (from FIGS. 4A and 4B) during positioning 1000 when applying winches located on a vessel. The passive suspenders 420I, II, III and the active suspenders 440I, II, III are shown. In particular, the guiding of active suspenders 440 is shown. A suspender 440 may be "turned or directed" by suspender guides 460 arranged according to a desirable suspender path. In this embodiment suspender guides 460 are arranged on the floater 200 for the active suspenders 440 to become substantially operatively available at the location.

Active suspender 440III can be followed from the operational location to a floater node 220III and to connect to a keel node 320III. The same applies for active suspenders 440II, 440I positioning respective keel nodes 320II, 320I.

The floating structure 100 may be configured with suspender guides 460 to accommodate one or more alternative suspender paths for alternative operational modes. A suspender guide may be chosen amongst a plurality of readily available chucks and bits according to the purpose.

Figure 6:
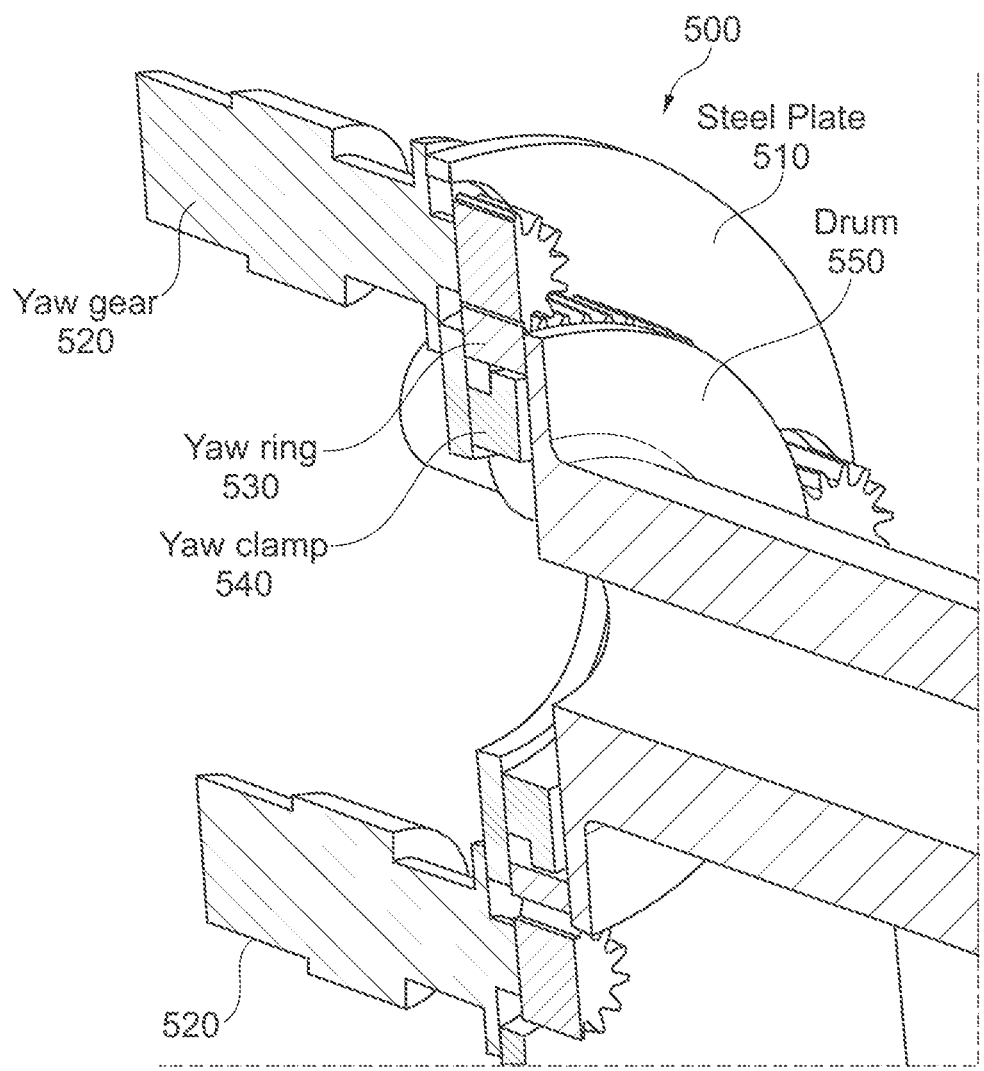
FIG. 6 illustrates aspects of a winch.

FIG. 6 illustrates aspects of a winch 500 operating an active suspender 440 (not shown). The winch 500 comprises a winch support 510 supporting an arrangement of here multiple yaw gears or motors 520 engaging with a yaw ring 530 to turn a drum 550.

The winch support 510 may be configured to be placed on the floater or on a vessel as will be illustrated.

FIGS. 7A-7C illustrate operating active suspenders 440 by winches 500 on a floating structure 100.

FIGS. 7A and B illustrate the apex 242 of the floating structure 100 supporting a wind turbine generator tower 122. The floating structure 100 is configured with a winch 500 where a winch support 510 is fixed to the floating structure 100 and supporting a drum 550 and multiple yaw gears 520.

FIG. 7C illustrates the winch 500 arranged towards the apex 242 and to be installed and operated from a platform at the apex 242. An active suspender 440 runs from the winch 500 along a leg of the tetrahedral structure 240 to a suspender guide 460 at a floater node 220 and towards a keel connection point 454 (not shown).

Figure 8:
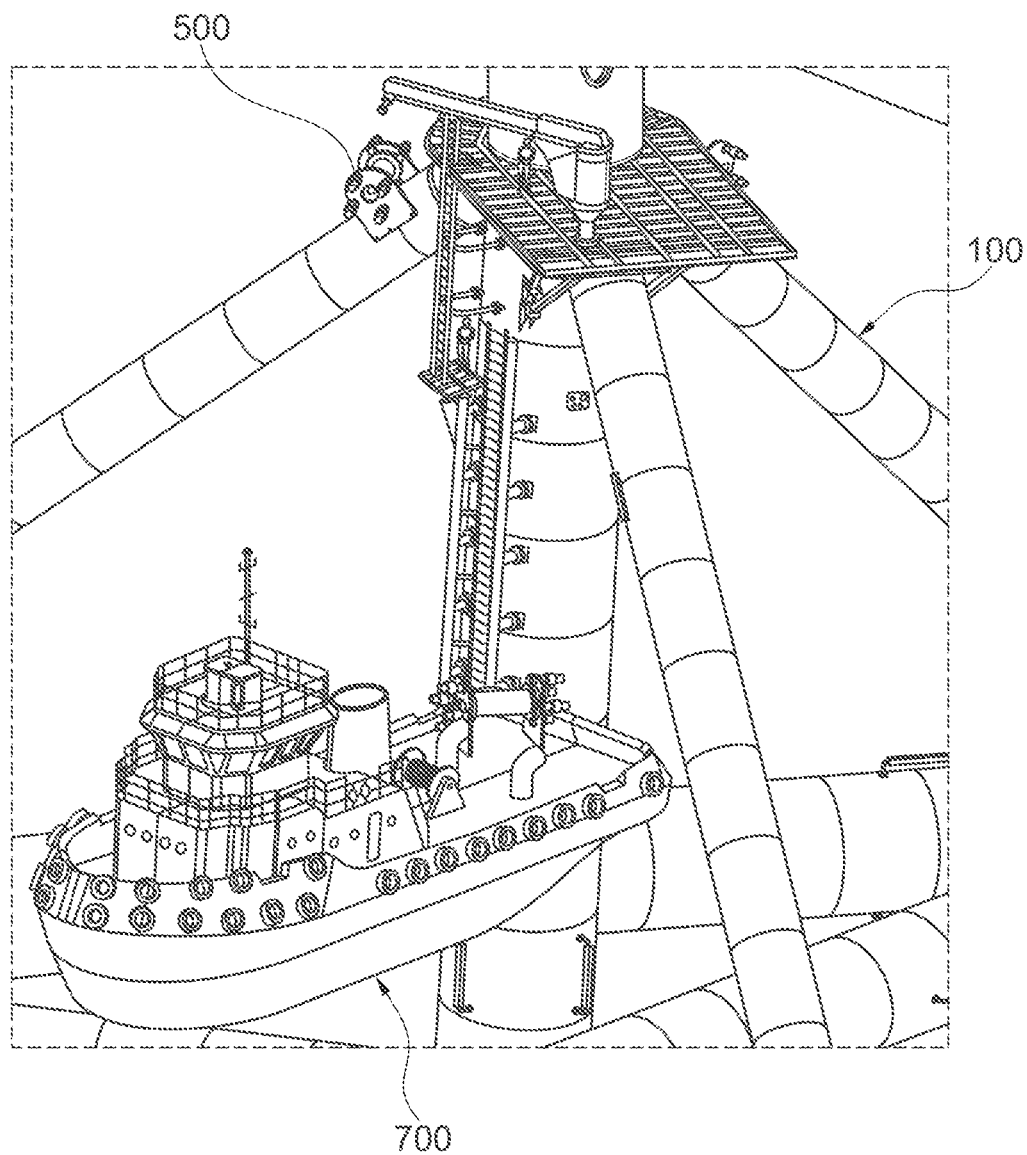
FIG. 8 illustrates installation of winches on a floating structure.

FIG. 8 illustrates installation of a winch 500 on a floating structure 100. The winch 500 may be supplied via a vessel 700 and hoisted to be installed on the floating structure 100. As such the floating structure 100 may be prepared to receive one or more winches 500 that can be installed temporally when the keel 300 (not shown) is to be positioned.

Figure 9:
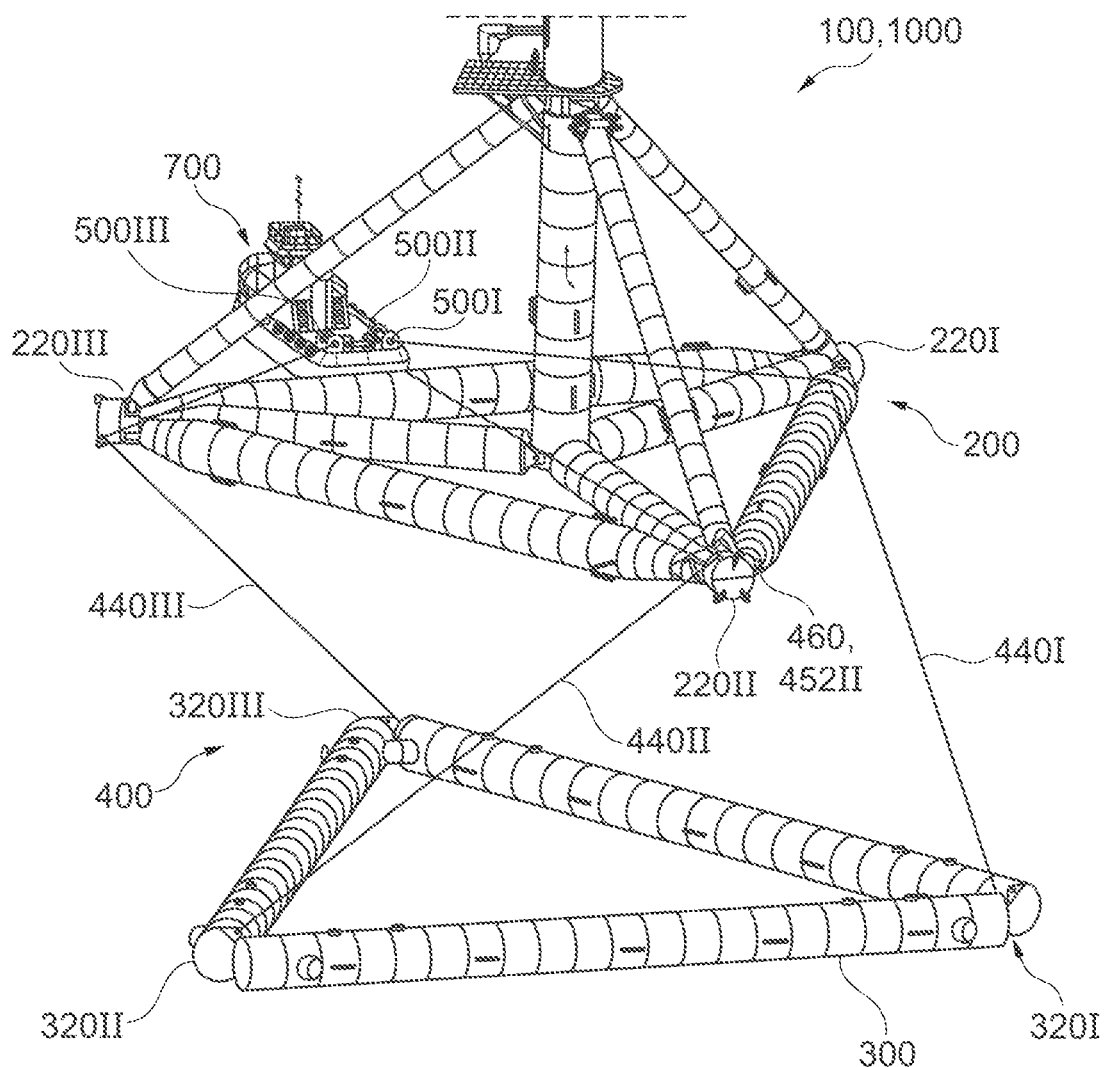
FIG. 9 illustrates positioning of a keel by operating suspenders by winches arranged on a single vessel.

FIGS. 9 and 10 illustrate positioning 1000 of a keel by operating active suspenders 440I, II, III by respective winches 500I, II, III arranged on single vessel 700. For the sake of simplicity, the passive suspenders 420 are not shown.

The vessel 700 holds three individually controllable winches 500I, II, III. A first winch 500I operates a first active suspender 440I guided to a first floater node 220I of the floater 200 and connects to a first keel node 320 on a keel 300. For the triangularly shaped floater 233 and keel 333 the respective paths of suspenders 440I, II, III are illustrated. It is observed that the vessel 700 is located at the center of a floater leg opposite the floater node 220II, resulting in force perpendicularly on the floater leg connecting the opposite floater node 220II. Dampers 710 may be applied on the floater leg. It is also seen that the two other active suspenders 440III, I are guided directly from respective floater nodes 220III, I to the respective winches 500III, I on the vessel 700 resulting in a force that is parallel to the resulting force from the active suspender line 440II.

This arrangement allows for use of only a single vessel and applies or distributes operational forces on the floating structure 100 in a manageable fashion during positioning 1000 of the keel 300.

FIG. 10A details the arrangement of active suspenders 440 from the respective winches 500 on the vessel 700 engaged via dampers 710 to the floating structure 100 during positioning 1000. In particular, the argument of floating connection points 452 on a floater node 220 is illustrated. As an example, the active suspender 440III operated by a winch 500III is seen to go directly to the floater connection point 452III at the floater node 220III and from there connect to the keel node 320III at a keel connection point 454III placed at the end of a keel element 310III-I towards the keel node 320III.

FIG. 10B illustrates the engagement of the vessel 700 with the floating structure 100 via dampers 710 and the active suspenders 440 entering the vessel 700. For simplification, the passive suspenders 420 are not shown.

FIG. 10C details the arrangement of winches 500I,II,III on the single vessel 700.

Positioning 1200 is performed with a single vessel 700 comprising multiple winches 500; 500I,II,III each operating respective active suspenders 440; 440I,II,III connected to respective keel nodes 320; 320I,II,III for positioning 1200 the keel 300. The keel nodes 320I,II,III may be positioned simultaneously or step-wise.

Figure 11A:
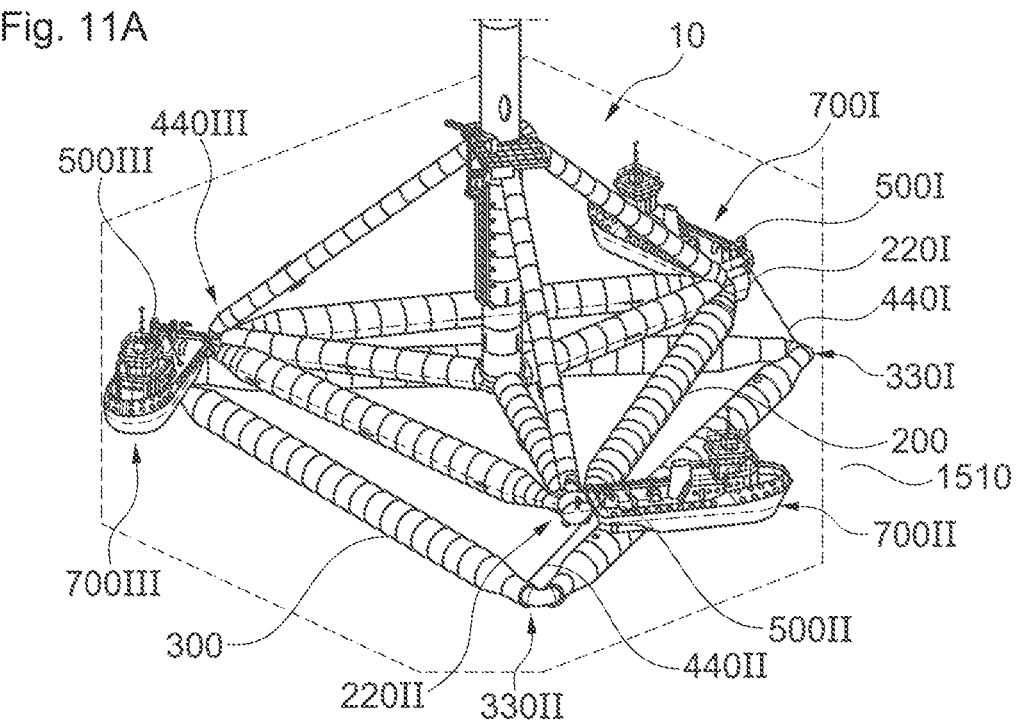
FIG. 11A illustrates positioning of a keel by operating individual suspenders by a winch arranged on respective vessels—one vessel per node.
Figure 11B:
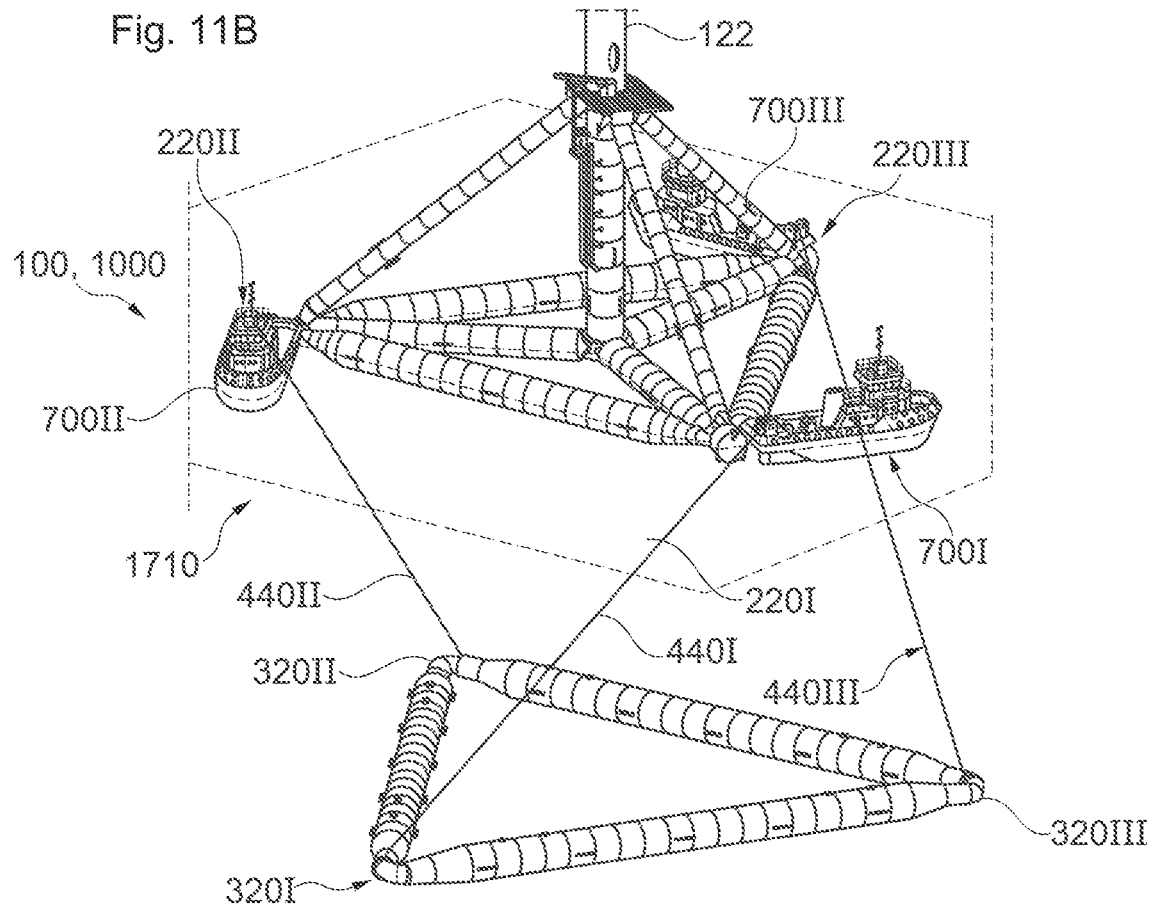
FIG. 11B illustrates positioning of a keel by operating individual suspenders by a winch arranged on respective vessels—one vessel per node.

FIGS. 11A-B detail the arrangement of active suspenders 440 from the respective winches 500 on the vessel 700 the floating structure 100 during positioning 1000 of a keel by operating individual suspenders by a winch arranged on respective vessels—one vessel 700I, II, III per floating node 220I, II, III.

Positioning 1000 the keel is performed with a vessel 700I,II,III operating an active suspender 440I,II,III at each floater node 220I,II,III of the floater 200 for positioning 1200 the keel nodes 320I,II,III either simultaneously or stepwise to positioning the keel 300. In the shown embodiment, a first vessel 700I supports a first winch 500I and the first vessel is engaged with the floating structure 100 at a first floating node 220I. A first active suspender 440I is operated by the first winch 500I directly to a first keel node 330I. The second and third keel nodes 320II, III are operated in the same way.

FIG. 11A illustrates positioning 1000 of the keel 300 just after the transport position 1510 and FIG. 11B illustrates positioning 1000 of the keel at about the deployed position 1710.

Figure 12A:
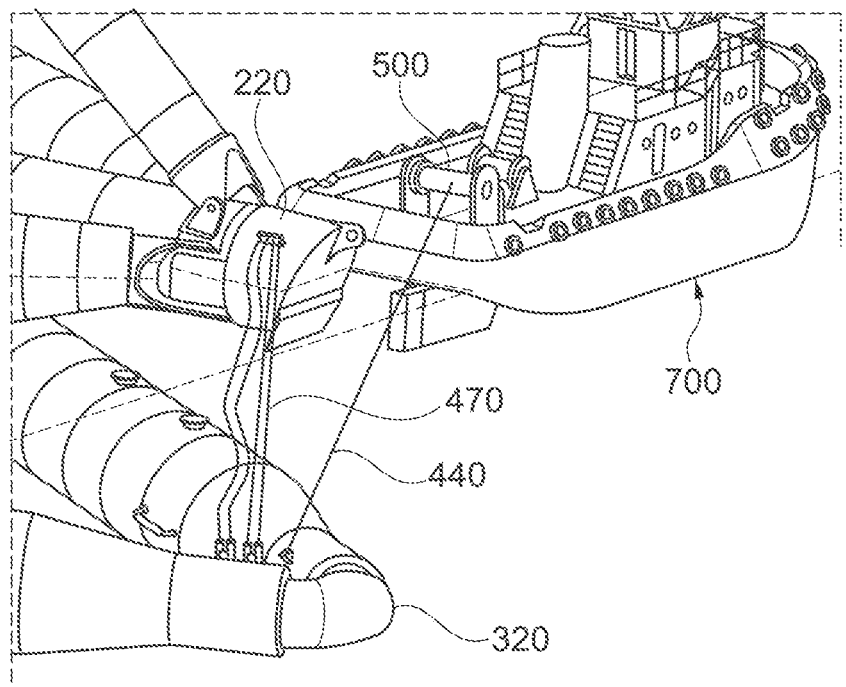
FIG. 12A illustrates a single vessel positioning an individual keel node step-wise.
Figure 12B:
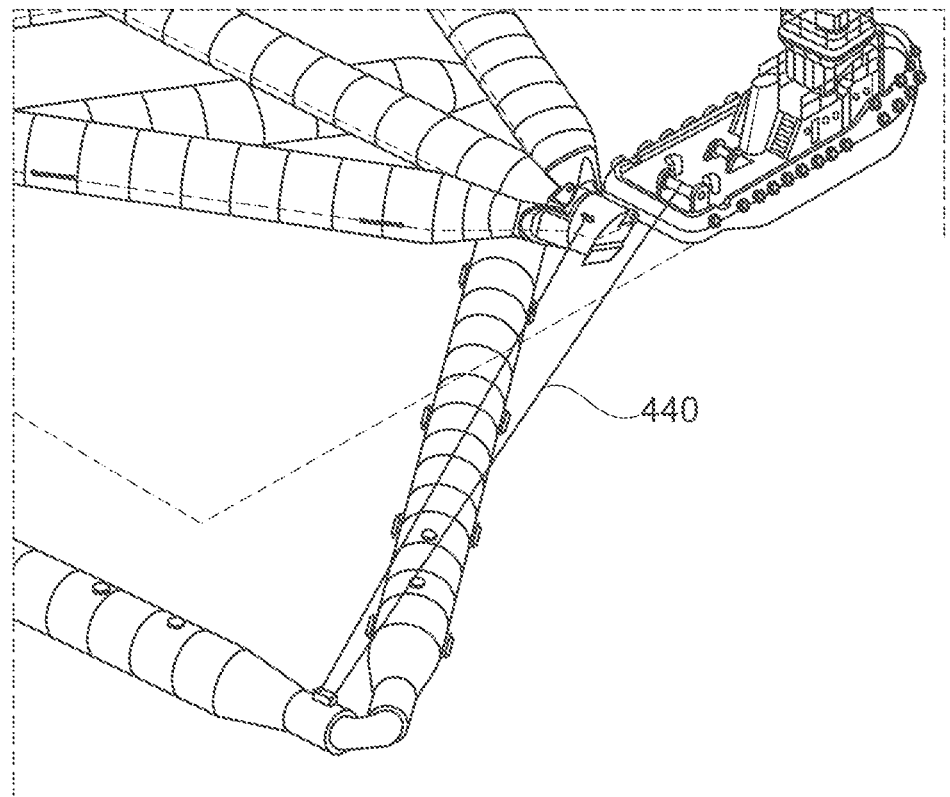
FIG. 12B illustrates a single vessel positioning an individual keel node step-wise.

FIGS. 12A and B illustrates a single vessel 700 with a winch 500 operating or positioning 1000 a keel node 320 at a floater node 220 by a suspender 440. The suspender is seen to be kept taut. Also seen is a transport line 470 on FIG. 12A. The transport line 470 is kept taut. Positioning 1000 of the keel 300 is performed by a single vessel 700 operating an active suspender 440I,II,III at each floater node 220I,II,III of the floater 200 to position 1200 the keel node 320I,II,III one-by-one and stepwise.

Figure 13A:
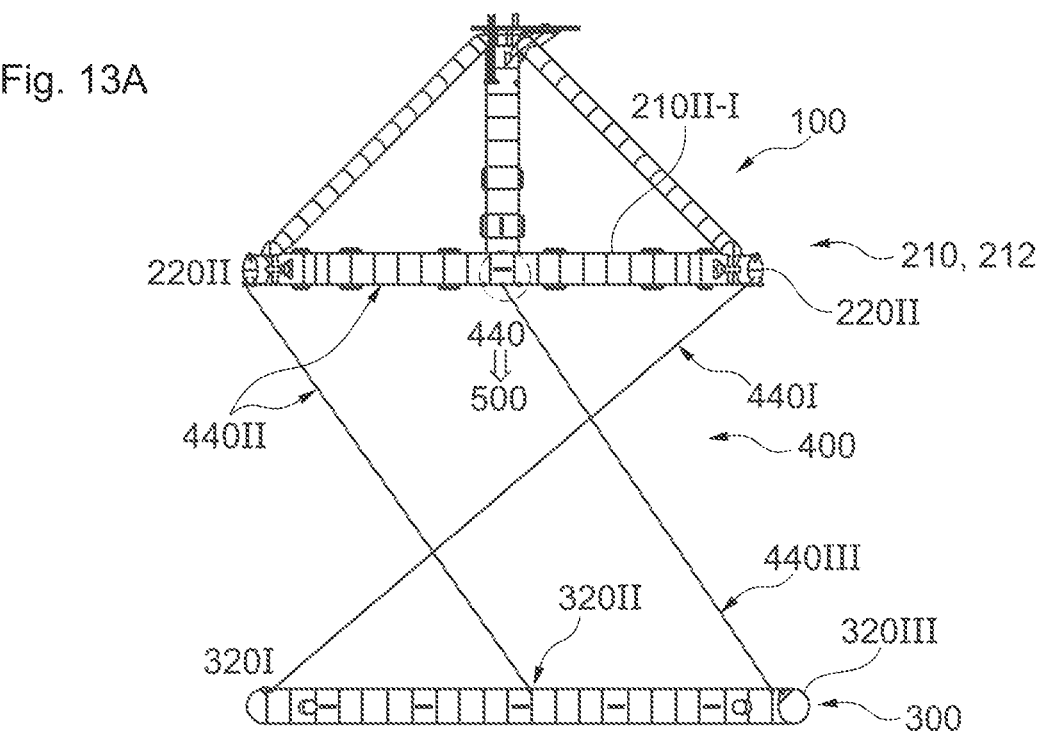
FIG. 13A illustrates a single vessel with a single winch positioning a keel.
Figure 13B:
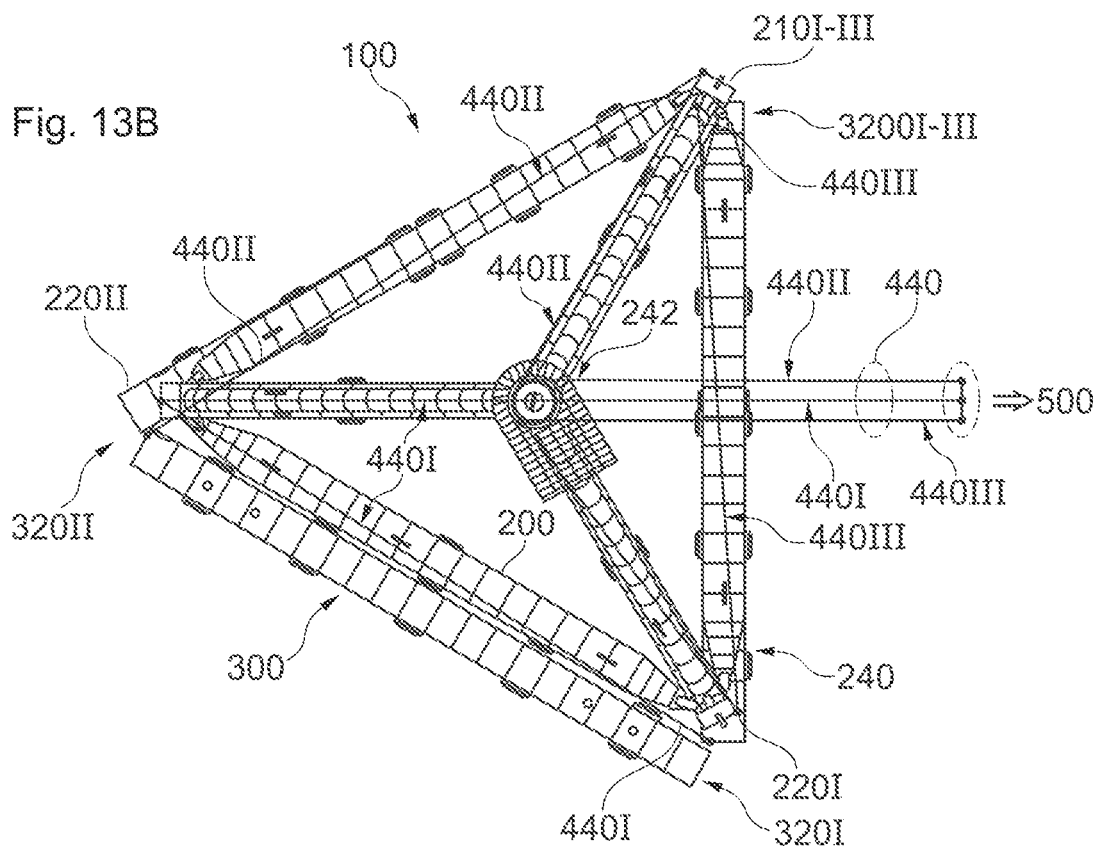
FIG. 13B illustrates a single vessel with a single winch positioning a keel.

FIGS. 13A and B illustrates a floating structure 100 configured with active suspenders 440 with operative ends located to be operated by a single winch 500 (not shown). The floater nodes 220I,II,III and the keel nodes 320I,II,III are as explained in the previous figures.

Positioning 1200 is performed with a single vessel 700 with a single winch 500 operating multiple active suspenders 440I,II,III connected to the respective keel nodes 320I, II,III to position 1200 keel nodes 320I,II,III simultaneously and thereby positioning the keel 300.

The active suspenders 440I, II, III are shown to have a common connection to a single winch 500 at about sea level or in the plane of the floater 200 in FIG. 10A. The active suspenders are guided to approximately the center of a leg or floater element 210II-I of the floater base 212.

The active suspenders 440I, II, III are shown to have a common connection to a single winch 500 at above sea level or the plane of the floater 200 in FIG. 10B. Active suspenders 440I,II,III are guided along the legs of the tetrahedral structure 240. The paths and the uniform forces applied by the winch 500 are equally distributed along the legs of the tetrahedral structure 240 and here distributed from about the apex 242.

Figure 14:
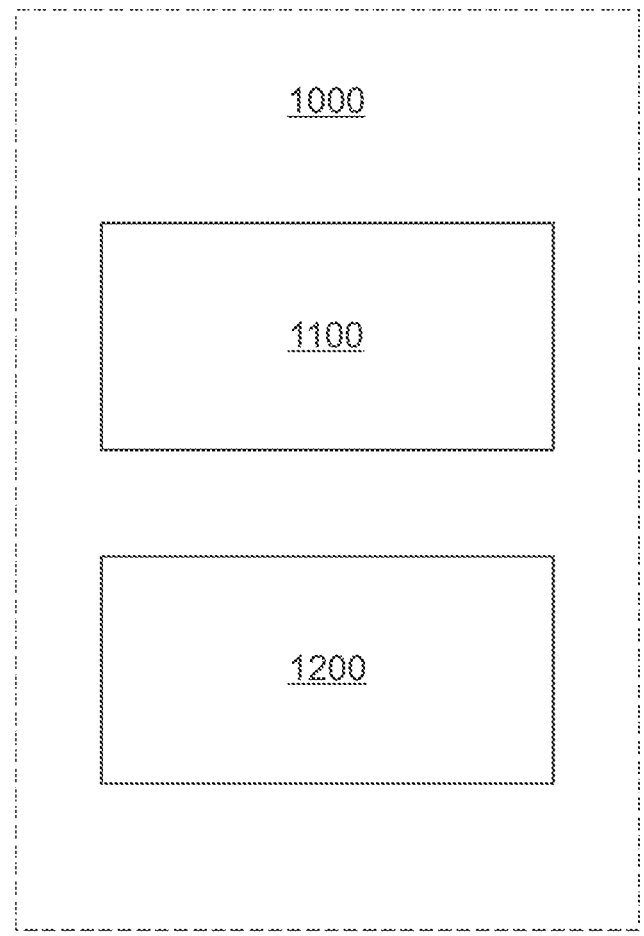
FIG. 14 illustrates a method of positioning a keel.

FIG. 14 illustrates a method of positioning a keel 1000 of a floating structure 100 (not shown).

The method comprises an act of providing 1100 a floating structure 100 comprising a keel 300 suspended by suspenders 400 to a floater 200 as readily identified as examples in the previous figures.

The method comprises an act of positioning 1000 the keel 300 whilst keeping 1210 the suspenders 400 substantially taut or under tension. The suspenders may be kept taut or under tension at all times or at least so in an intended or controlled manner.

The suspenders 400 may be provided as a passive suspender 420 and an active suspender 440 that engage at substantially the same connection point 450I; 452I and at separated connection points 450II, 450III; 454II, 454III on the respective floater 200 and keel 300 as exemplified in the previous figures.

The act of positioning 1200 may be performed by operatively adjusting the length of the active suspender 440 whilst keeping the active suspender 440 substantially taut at all times during positioning 1200.

The method of positioning 1200 may be performed by operating a configuration where the passive suspender 420 and active suspender 440 at one end 410A engage at substantially the same connection point 450I; 452I and another end 410B at separate connection points 450II, 450III; 454II, 454III on the respective floater 200 and keel 300 as exemplified in the previous figures.

Figure 15:
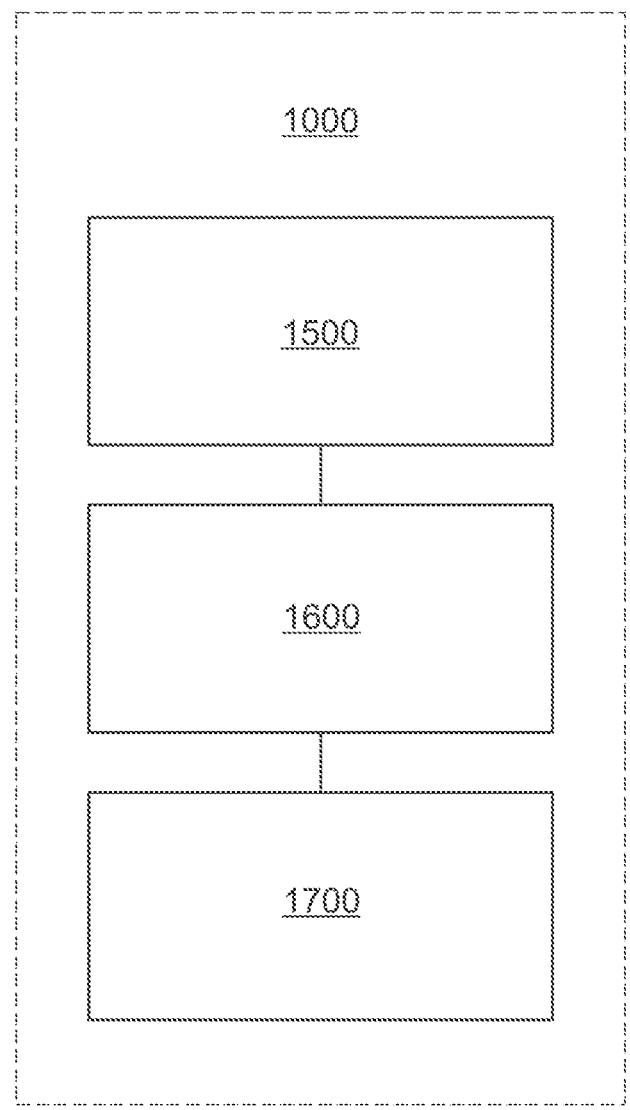
FIG. 15 illustrates a method of transporting, installing and deploying a floating structure.

FIG. 15 illustrates a method of positioning 1000 a keel 300 during one or more of acts of transporting 1500, installing 1600 and deployment 1700.

The act of transporting 1500 may be performed with the keel 300 in a transport position 1510 as exemplified in the previous figures. The transport mode or position 1510 may be with a relatively low inertia of the floating structure.

The act of installing 1600 may be performed with the keel in an installation position 1610 as exemplified as an intermediate position of the keel in the previous figures. The installation mode or position 1610 may be with an intermediate but intended inertia, according to the installation stage and inertia of the structure supported by the floating sting structure, e.g., a wind turbine generator being assembled.

The act of deployment 1700 may be performed with the keel 300 in a deployed position 1710 as exemplified in the previous figures. The deployed mode or position 1710 may be with a relatively high inertia of the floating structure.

With reference to the previous figures, the floater 200 may substantially be a floater triangle 233 and the keel 300 substantially is a keel triangle 333. The act of positioning 1200 the keel 300 is performed to a transport position 1510 where the floater triangle 233 and the keel triangle 333 substantially form a single triangle when superimposed as illustrated in e.g., FIGS. 2A and 2B.

The act of positioning 1000 may be to a deployed position 1710 where the floater triangle 233 and the keel triangle 333 substantially form a star when superimposed as illustrated in e.g., FIGS. 3 and 9.

The act of positioning 1000 may be to an installation position 1610 where the floater triangle 233 and the keel triangle 333 is in an intermediate position between the transport position 1510 and the deployed position 1710 as illustrated in e.g., FIGS. 4 and 5.

With reference to the above-mentioned figures embodiments of the present method includes: A method of installing an offshore floating structure 100, wherein the floating structure 100 comprises a floater 200 with positive buoyancy and a keel 300 with negative buoyancy, as well as suspenders 400 connecting the keel 300 and the floater 200 with each other (FIG. 1)

wherein the floater 200 has a number of floater nodes 220 arranged in polygonal configuration, including a first floater node 220I, a second floater node 220II, and a third floater node 220III, and the keel 300 has a corresponding number of keel nodes 320 arranged in polygonal configuration, including a first keel node 320I, a second keel node 320II, and a third keel node 320II (FIGS. 2A and 2B)

wherein the suspenders 400 are provided in a corresponding number of suspender pairs, each pair comprising a passive suspender 420 and an active suspender 440 (FIG. 4A)

wherein each of the active suspenders 440 connect only one floater node 220 with only one keel node 320, wherein the first floater node 220I and the first keel node 320I are connected by a first active suspender 440I-I, wherein the second floater node 220II and the second keel node 320II are connected by a second active suspender 440II-II, wherein the third floater node 220III and the third keel node 320III are connected by a third active suspender 440III-III, (FIG. 4A)

wherein each of the passive suspenders 420 connect only one floater node 220 with only one keel node 320, wherein the first floater node (220I) and the second keel node 320II are connected by a first passive suspender 420I-II, wherein the second floater node 220II and the third keel node 320III are connected by a second passive suspender 420II-III, and wherein a third passive suspender 420III-I connects the third floater node 220III with a keel node 320I that is neighbor to the second keel node 320II, wherein this neighbor keel node is the first keel node 320I in the case of the keel only having three keel nodes 320; (FIG. 4A)

wherein the method comprises suspending the keel 300 by the suspenders 400 in a first position 1001 at a first depth under water below the floater 200; (FIG. 1) The method may comprise keeping 1210 the suspenders 400 substantially taut while changing the vertical distance between the floater 200 and the keel 300 from the first position 1001 at the first depth to a second position 1002 at a second depth under water by changing the length of all active suspenders 440 and causing a rotation of the keel 220 relatively to the floater 300 about the vertical direction by maintaining each of the passive suspenders 420 at a fixed length with a fixed distance between its connection point on the floater and its connection point on the keel.

The keel 300 can be formed as a polygon 330 with keel elements 310 comprising negative buoyancy elements connected at the keel nodes 320 and wherein the floater 200 is formed as a polygon 230 with floater elements 210 comprising positive buoyancy elements connected at the floater nodes 220.

The floater may according to some embodiments have only three floater nodes 220 which are arranged as a triangle and from which suspenders 400 extend to the keel nodes 320, and wherein the keel 300 has only three keel nodes (320) which are arranged as a triangle from which the suspenders 400 extend to the floater 220.

The floater 200 can be formed substantially as a floater triangle 233 and the keel 300 is substantially formed as a complementary shaped keel triangle 333, and wherein the method comprises transporting the offshore floating structure 100 to an offshore deployment site while the floater triangle 233 and the keel triangle 333 substantially form a single triangle when superimposed, and at the site changing to a deployed configuration where the floater triangle 233 and the keel triangle are rotated relatively to each other.

The floater 200 can be formed as a tetrahedral structure 240 with a floater base 212 that comprises buoyancy elements connected at the floater nodes 220 and wherein an apex 240 of the tetrahedral structure 240 supports a wind turbine tower 122.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of installing an offshore floating structure, wherein the floating structure comprises a floater with positive buoyancy and a keel with negative buoyancy, as well as suspenders connecting the keel and the floater with each other, wherein the floater has a number of floater nodes arranged in polygonal configuration, including a first floater node, a second floater node, and a third floater node, and the keel has a corresponding number of keel nodes arranged in polygonal configuration, including a first keel node, a second keel node, and a third keel node;

wherein the suspenders are provided in a corresponding number of suspender pairs, each pair comprising a passive suspender and an active suspender, wherein each of the active suspenders connect only one floater node with only one keel node, wherein the first floater node and the first keel node are connected by a first active suspender, wherein the second floater node and the second keel node are connected by a second active suspender, wherein the third floater node and the third keel node are connected by a third active suspender, wherein each of the passive suspenders connect only one floater node with only one keel node, wherein the first floater node and the second keel node are connected by a first passive suspender, wherein the second floater node and the third keel node are connected by a second passive suspender, and wherein a third passive suspender connects the third floater node with a keel node that is neighbor to the second keel node, wherein this neighbor keel node is the first keel node in the case of the keel only having three keel nodes;

wherein the method comprises suspending the keel by the suspenders in a first position at a first depth under water below the floater;

wherein, the method comprises keeping the suspenders substantially taut while changing the vertical distance between the floater and the keel from the first position at the first depth to a second position at a second depth under water by changing the length of all active suspenders and causing a rotation of the keel relatively to the floater about the vertical direction by maintaining each of the passive suspenders at a fixed length with a fixed distance between its connection point on the floater and its connection point on the keel.

2. The method according to claim 1, wherein the keel is formed as a polygon with keel elements comprising negative buoyancy elements connected at the keel nodes and wherein the floater is formed as a polygon with floater elements comprising positive buoyancy elements connected at the floater nodes.

3. The method according to claim 1, wherein the floater has only three floater nodes which are arranged as a triangle and from which suspenders extend to the keel nodes, and wherein the keel has only three keel nodes which are arranged as a triangle from which the suspenders extend to the floater.

4. The method according to claim 3, wherein the floater is formed substantially as a floater triangle and the keel is substantially formed as a complementary shaped keel triangle, and wherein the method comprises transporting the offshore floating structure to an offshore deployment site while the floater triangle and the keel triangle substantially form a single triangle when superimposed, and at the site changing to a deployed configuration where the floater triangle and the keel triangle are rotated relatively to each other.

5. The method according to claim 1, wherein the floater is formed as a tetrahedral structure with a floater base that comprises buoyancy elements connected at the floater nodes and wherein an apex of the tetrahedral structure supports a wind turbine tower.

6. The method according to claim 1, wherein the act of positioning is performed by operating the suspenders by one or more winches arranged on the floating structure.

7. The method according to claim 1, wherein the act of positioning is performed by operating the suspenders by one or more winches arranged on one or more vessels.

8. The method according to claim 7, wherein the act of positioning is performed with a vessel each with a winch operating an active suspender at each floater node of the floater to position the keel.

9. The method according to claim 7, wherein the act of positioning is performed by a single vessel operating an active suspender at each floater node of the floater to position the keel node one-by-one and stepwise.

10. The method according to claim 7, wherein the act of positioning (1200) is performed with a single vessel comprising multiple winches each operating respective active suspenders connected to respective keel nodes to position the keel.

11. The method according to claim 7, wherein the act of positioning is performed with a single vessel with a single winch operating multiple active suspenders connected to respective keel nodes to position the keel.

12. The method according to claim 1, wherein the support structure is an offshore support structure for a wind turbine.

13. Use of a method according to claim 1 for installing a support structure of a wind turbine at offshore conditions.

* * * * *